(12) United States Patent
Turney et al.

(10) Patent No.: US 10,007,259 B2
(45) Date of Patent: Jun. 26, 2018

(54) SYSTEMS AND METHODS FOR ENERGY COST OPTIMIZATION IN A BUILDING SYSTEM

(71) Applicant: Johnson Controls Technology Company, Holland, MI (US)

(72) Inventors: Robert D. Turney, Watertown, WI (US); Michael J. Wenzel, Oak Creek, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 167 days.

(21) Appl. No.: 15/068,470

(22) Filed: Mar. 11, 2016

(65) Prior Publication Data

US 2016/0195866 A1 Jul. 7, 2016

Related U.S. Application Data

(63) Continuation of application No. 13/802,279, filed on Mar. 13, 2013, now Pat. No. 9,436,179.

(51) Int. Cl.
  *G05B 15/02* (2006.01)
  *G05B 19/042* (2006.01)
  *G05B 23/02* (2006.01)

(52) U.S. Cl.
  CPC ............ *G05B 23/02* (2013.01); *G05B 15/02* (2013.01); *G05B 19/042* (2013.01);
  (Continued)

(58) Field of Classification Search
  CPC ...... G05B 23/02; G05B 15/02; G05B 19/042; G05B 2219/2642; G05B 2219/2639;
  (Continued)

(56) References Cited

U.S. PATENT DOCUMENTS

| 4,061,185 A | 12/1977 | Faiczak |
| 4,349,869 A | 9/1982 | Prett et al. |

(Continued)

OTHER PUBLICATIONS

RAP.org, Time-Varying and Dynamic Rate Design, published by www.raponline.org on Jul. 2012.
(Continued)

*Primary Examiner* — Ronald D Hartman, Jr.
(74) *Attorney, Agent, or Firm* — Foley & Lardner LLP

(57) ABSTRACT

A controller is configured to use an energy cost function to predict a total cost of energy purchased from an energy provider as a function of one or more setpoints provided by the controller. The energy cost function includes a demand charge term defining a cost per unit of power corresponding to a maximum power usage of the building system. The controller is configured to linearize the demand charge term by imposing demand charge constraints and to mask each of the demand charge constraints that applies to an inactive pricing period. The controller is configured to determine optimal values of the one or more setpoints by performing an optimization procedure that minimizes the total cost of energy subject to the demand charge constraints and to provide the optimal values of the one or more setpoints to equipment of the building system that operate to affect the maximum power usage.

20 Claims, 13 Drawing Sheets

(52) U.S. Cl.
CPC ............ *G05B 2219/2639* (2013.01); *G05B 2219/2642* (2013.01); *Y02B 70/32* (2013.01); *Y02B 70/3225* (2013.01); *Y02B 70/3241* (2013.01); *Y04S 20/20* (2013.01); *Y04S 20/222* (2013.01); *Y04S 20/224* (2013.01); *Y04S 20/40* (2013.01); *Y04S 20/44* (2013.01); *Y04S 20/46* (2013.01)

(58) Field of Classification Search
CPC ........ Y04S 20/46; Y04S 20/20; Y04S 20/222; Y04S 20/224; Y04S 20/40; Y04S 20/44; Y02B 70/32; Y02B 70/3225; Y02B 70/3241
See application file for complete search history.

(56) References Cited

U.S. PATENT DOCUMENTS

| | | | |
|---|---|---|---|
| 4,616,308 | A | 10/1986 | Morshedi et al. |
| 5,289,362 | A | 2/1994 | Liebl et al. |
| 5,301,101 | A | 4/1994 | MacArthur et al. |
| 5,347,446 | A | 9/1994 | Iino et al. |
| 5,351,184 | A | 9/1994 | Lu et al. |
| 5,408,406 | A | 4/1995 | Mathur et al. |
| 5,442,544 | A | 8/1995 | Jelinek |
| 5,519,605 | A | 5/1996 | Cawlfield |
| 5,572,420 | A | 11/1996 | Lu |
| 5,924,486 | A | 7/1999 | Ehlers et al. |
| 6,055,483 | A | 4/2000 | Lu |
| 6,122,555 | A | 9/2000 | Lu |
| 6,141,595 | A | 10/2000 | Gloudeman et al. |
| 6,167,389 | A | 12/2000 | Davis |
| 6,278,899 | B1 | 8/2001 | Piche et al. |
| 6,347,254 | B1 | 2/2002 | Lu |
| 6,385,510 | B1 | 5/2002 | Hoog et al. |
| 6,459,939 | B1 | 10/2002 | Hugo |
| 6,574,581 | B1 | 6/2003 | Bohrer et al. |
| 6,577,962 | B1 | 6/2003 | Afshari |
| 6,785,592 | B1 | 8/2004 | Smith et al. |
| 6,807,510 | B1 | 10/2004 | Backstrom et al. |
| 6,934,931 | B2 | 8/2005 | Plumer et al. |
| 6,976,366 | B2 | 12/2005 | Starling et al. |
| 7,039,475 | B2 | 5/2006 | Sayyarrodsari et al. |
| 7,050,863 | B2 | 5/2006 | Mehta et al. |
| 7,050,866 | B2 | 5/2006 | Martin et al. |
| 7,069,161 | B2* | 6/2006 | Gristina ............ G01D 4/004 340/870.02 |
| 7,152,023 | B2 | 12/2006 | Das |
| 7,165,399 | B2 | 1/2007 | Stewart |
| 7,188,779 | B2 | 3/2007 | Alles |
| 7,197,485 | B2 | 3/2007 | Fuller |
| 7,203,554 | B2 | 4/2007 | Fuller |
| 7,266,416 | B2 | 9/2007 | Gallestey et al. |
| 7,272,454 | B2 | 9/2007 | Wojsznis et al. |
| 7,274,975 | B2 | 9/2007 | Miller |
| 7,275,374 | B2 | 10/2007 | Stewart et al. |
| 7,328,074 | B2 | 2/2008 | Das et al. |
| 7,328,577 | B2 | 2/2008 | Stewart et al. |
| 7,376,471 | B2 | 5/2008 | Das et al. |
| 7,376,472 | B2 | 5/2008 | Wojsznis et al. |
| 7,389,773 | B2 | 6/2008 | Stewart et al. |
| 7,400,933 | B2 | 7/2008 | Rawlings et al. |
| 7,418,372 | B2 | 8/2008 | Nishira et al. |
| 7,454,253 | B2 | 11/2008 | Fan |
| 7,496,413 | B2 | 2/2009 | Fan et al. |
| 7,565,227 | B2* | 7/2009 | Richard ............ G06Q 10/06312 700/286 |
| 7,577,483 | B2 | 8/2009 | Fan et al. |
| 7,591,135 | B2 | 9/2009 | Stewart |
| 7,599,897 | B2 | 10/2009 | Hartman et al. |
| 7,610,108 | B2 | 10/2009 | Boe et al. |
| 7,650,195 | B2 | 1/2010 | Fan et al. |
| 7,668,671 | B1* | 2/2010 | Gristina ............ G01D 4/004 700/291 |
| 7,676,283 | B2 | 3/2010 | Liepold et al. |
| 7,826,909 | B2 | 11/2010 | Attarwala |
| 7,844,352 | B2 | 11/2010 | Vouzis et al. |
| 7,848,900 | B2 | 12/2010 | Steinberg et al. |
| 7,856,281 | B2 | 12/2010 | Thiele et al. |
| 7,878,178 | B2 | 2/2011 | Stewart et al. |
| 7,894,943 | B2 | 2/2011 | Sloup et al. |
| 7,908,117 | B2 | 3/2011 | Steinberg et al. |
| 7,930,045 | B2 | 4/2011 | Cheng |
| 7,945,352 | B2 | 5/2011 | Koc |
| 7,949,416 | B2 | 5/2011 | Fuller |
| 7,987,145 | B2 | 7/2011 | Baramov |
| 7,996,140 | B2 | 8/2011 | Stewart et al. |
| 8,005,575 | B2 | 8/2011 | Kirchhof |
| 8,019,701 | B2 | 9/2011 | Sayyar-Rodsari et al. |
| 8,032,235 | B2 | 10/2011 | Sayyar-Rodsari |
| 8,036,758 | B2 | 10/2011 | Lu et al. |
| 8,046,089 | B2 | 10/2011 | Renfro et al. |
| 8,060,290 | B2 | 11/2011 | Stewart et al. |
| 8,073,659 | B2 | 12/2011 | Gugaliya et al. |
| 8,078,291 | B2 | 12/2011 | Pekar et al. |
| 8,086,352 | B1* | 12/2011 | Elliott ............ F24F 11/0009 700/275 |
| 8,105,029 | B2 | 1/2012 | Egedal et al. |
| 8,109,255 | B2 | 2/2012 | Stewart et al. |
| 8,121,818 | B2 | 2/2012 | Gorinevsky |
| 8,126,575 | B2 | 2/2012 | Attarwala |
| 8,145,329 | B2 | 3/2012 | Pekar et al. |
| 8,145,361 | B2 | 3/2012 | Forbes et al. |
| 8,172,153 | B1* | 5/2012 | Kennedy ............ F24D 19/1048 236/1 B |
| 8,180,493 | B1 | 5/2012 | Laskow |
| 8,185,217 | B2 | 5/2012 | Thiele |
| 8,200,346 | B2 | 6/2012 | Thiele |
| 8,335,596 | B2 | 12/2012 | Raman et al. |
| 8,417,391 | B1 | 4/2013 | Rombouts et al. |
| 8,443,071 | B2 | 5/2013 | Lu et al. |
| 8,548,638 | B2 | 10/2013 | Roscoe et al. |
| 8,600,561 | B1 | 12/2013 | Modi et al. |
| 8,720,791 | B2 | 5/2014 | Slingsby et al. |
| 8,751,432 | B2* | 6/2014 | Berg-Sonne ............ G05B 15/02 706/12 |
| 8,768,527 | B2 | 7/2014 | Tomita et al. |
| 8,825,219 | B2 | 9/2014 | Gheerardyn et al. |
| 8,862,280 | B1 | 10/2014 | Dyess et al. |
| 8,886,361 | B1 | 11/2014 | Harmon et al. |
| 8,903,560 | B2 | 12/2014 | Miller |
| 9,146,548 | B2* | 9/2015 | Chambers ............ G05B 15/02 |
| 9,235,657 | B1 | 1/2016 | Wenzel et al. |
| 9,261,863 | B2* | 2/2016 | Sloop ............ G05B 15/02 |
| 9,436,179 | B1* | 9/2016 | Turney ............ G05B 23/02 |
| 9,448,550 | B2* | 9/2016 | Ha ............ G05B 19/042 |
| 2003/0009401 | A1 | 1/2003 | Ellis |
| 2004/0095237 | A1 | 5/2004 | Chen et al. |
| 2004/0117330 | A1 | 6/2004 | Ehlers et al. |
| 2004/0128266 | A1* | 7/2004 | Yellepeddy ............ G05B 15/02 705/412 |
| 2004/0215529 | A1 | 10/2004 | Foster et al. |
| 2005/0027494 | A1 | 2/2005 | Erdogmus et al. |
| 2005/0096797 | A1 | 5/2005 | Matsubara et al. |
| 2005/0173865 | A1 | 8/2005 | Hochfeld |
| 2005/0194456 | A1 | 9/2005 | Tessier et al. |
| 2005/0203761 | A1 | 9/2005 | Barr et al. |
| 2006/0161450 | A1 | 7/2006 | Carey et al. |
| 2006/0259199 | A1 | 11/2006 | Gjerde et al. |
| 2006/0276938 | A1 | 12/2006 | Miller |
| 2007/0203860 | A1 | 8/2007 | Golden et al. |
| 2007/0213880 | A1 | 9/2007 | Ehlers |
| 2007/0276547 | A1 | 11/2007 | Miller |
| 2008/0010521 | A1 | 1/2008 | Goodrum et al. |
| 2008/0083234 | A1 | 4/2008 | Krebs et al. |
| 2009/0001180 | A1 | 1/2009 | Siddaramanna et al. |
| 2009/0048717 | A1* | 2/2009 | Richard ............ H02J 3/14 700/295 |
| 2009/0171862 | A1 | 7/2009 | Harrod et al. |
| 2009/0216382 | A1 | 8/2009 | Ng |
| 2010/0013863 | A1 | 1/2010 | Harris |
| 2010/0106332 | A1 | 4/2010 | Chassin et al. |
| 2010/0141046 | A1 | 6/2010 | Paik |

(56) References Cited

U.S. PATENT DOCUMENTS

| | | |
|---|---|---|
| 2010/0204845 A1 | 8/2010 | Ohuchi et al. |
| 2010/0235004 A1 | 9/2010 | Thind |
| 2010/0244571 A1 | 9/2010 | Spitaels et al. |
| 2010/0262313 A1* | 10/2010 | Chambers .............. G05B 15/02 700/295 |
| 2010/0269854 A1 | 10/2010 | Barbieri et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022193 A1 | 1/2011 | Panaitescu |
| 2011/0046792 A1 | 2/2011 | Imes et al. |
| 2011/0060424 A1 | 3/2011 | Havlena |
| 2011/0106327 A1 | 5/2011 | Zhou et al. |
| 2011/0106328 A1 | 5/2011 | Zhou et al. |
| 2011/0125293 A1 | 5/2011 | Havlena |
| 2011/0153090 A1 | 6/2011 | Besore et al. |
| 2011/0160913 A1 | 6/2011 | Parker et al. |
| 2011/0178977 A1 | 7/2011 | Drees |
| 2011/0184564 A1 | 7/2011 | Amundson et al. |
| 2011/0184565 A1 | 7/2011 | Peterson |
| 2011/0202185 A1 | 8/2011 | Imes et al. |
| 2011/0202193 A1 | 8/2011 | Craig et al. |
| 2011/0218691 A1 | 9/2011 | O'Callaghan et al. |
| 2011/0231320 A1 | 9/2011 | Irving |
| 2011/0238224 A1 | 9/2011 | Schnell et al. |
| 2011/0257789 A1 | 10/2011 | Stewart et al. |
| 2011/0257911 A1 | 10/2011 | Drees et al. |
| 2011/0290893 A1 | 12/2011 | Steinberg |
| 2011/0301723 A1 | 12/2011 | Pekar et al. |
| 2012/0016524 A1 | 1/2012 | Spicer et al. |
| 2012/0053740 A1 | 3/2012 | Venkatakrishnan et al. |
| 2012/0053741 A1 | 3/2012 | Beyerle et al. |
| 2012/0053745 A1 | 3/2012 | Ng |
| 2012/0059351 A1 | 3/2012 | Nordh |
| 2012/0060505 A1 | 3/2012 | Fuller et al. |
| 2012/0065805 A1 | 3/2012 | Montalvo |
| 2012/0084063 A1 | 4/2012 | Drees et al. |
| 2012/0109394 A1 | 5/2012 | Takagi et al. |
| 2012/0109620 A1 | 5/2012 | Gaikwad et al. |
| 2012/0116546 A1 | 5/2012 | Sayyar-Rodsari |
| 2012/0130924 A1 | 5/2012 | James |
| 2012/0150707 A1 | 6/2012 | Campbell et al. |
| 2012/0209442 A1 | 8/2012 | Ree |
| 2012/0232701 A1 | 9/2012 | Carty et al. |
| 2012/0259469 A1 | 10/2012 | Ward et al. |
| 2012/0278221 A1 | 11/2012 | Fuller et al. |
| 2012/0296799 A1 | 11/2012 | Playfair et al. |
| 2012/0310416 A1 | 12/2012 | Tepper et al. |
| 2012/0316695 A1 | 12/2012 | Chen et al. |
| 2012/0330465 A1 | 12/2012 | O'Neill et al. |
| 2012/0330671 A1 | 12/2012 | Fan et al. |
| 2013/0013119 A1 | 1/2013 | Mansfield et al. |
| 2013/0013121 A1 | 1/2013 | Henze et al. |
| 2013/0013124 A1 | 1/2013 | Park et al. |
| 2013/0024029 A1 | 1/2013 | Tran et al. |
| 2013/0060391 A1 | 3/2013 | Deshpande et al. |
| 2013/0066571 A1 | 3/2013 | Chamarti et al. |
| 2013/0085614 A1 | 4/2013 | Wenzel et al. |
| 2013/0090777 A1 | 4/2013 | Lu et al. |
| 2013/0110299 A1 | 5/2013 | Meyerhofer et al. |
| 2013/0123996 A1 | 5/2013 | Matos |
| 2013/0184892 A1* | 7/2013 | Mohan .................. G05B 15/02 700/297 |
| 2013/0190940 A1* | 7/2013 | Sloop .................... G05B 15/02 700/291 |
| 2013/0204439 A1* | 8/2013 | Scelzi ................... G06Q 10/00 700/276 |
| 2013/0226316 A1* | 8/2013 | Duchene ............... G05B 15/02 700/17 |
| 2013/0231792 A1* | 9/2013 | Ji ........................... G05B 19/02 700/291 |
| 2013/0238157 A1* | 9/2013 | Luke ................... H02J 13/0006 700/295 |
| 2013/0245847 A1 | 9/2013 | Steven et al. |
| 2013/0268126 A1 | 10/2013 | Iwami et al. |
| 2013/0308674 A1 | 11/2013 | Kramer et al. |
| 2013/0311793 A1 | 11/2013 | Chang |
| 2013/0325377 A1 | 12/2013 | Drees et al. |
| 2013/0340450 A1 | 12/2013 | Ashrafzadeh et al. |
| 2013/0345880 A1* | 12/2013 | Asmus ............... G05D 23/1917 700/276 |
| 2014/0067132 A1 | 3/2014 | Macek et al. |
| 2014/0094979 A1 | 4/2014 | Mansfield |
| 2014/0128997 A1 | 5/2014 | Holub et al. |
| 2014/0148953 A1 | 5/2014 | Nwankpa et al. |
| 2014/0203092 A1 | 7/2014 | Broniak et al. |
| 2014/0222396 A1 | 8/2014 | Wen et al. |
| 2014/0229016 A1 | 8/2014 | Shiflet |
| 2014/0229026 A1 | 8/2014 | Cabrini |
| 2014/0316973 A1 | 10/2014 | Steven et al. |
| 2014/0379099 A1* | 12/2014 | Premereur ................ H02J 3/14 700/19 |
| 2015/0105918 A1 | 4/2015 | Lee |
| 2015/0142179 A1 | 5/2015 | Ito et al. |
| 2015/0192317 A1 | 7/2015 | Asmus |
| 2015/0276253 A1 | 10/2015 | Montalvo |
| 2016/0195866 A1 | 7/2016 | Turney et al. |

OTHER PUBLICATIONS

Office Action for U.S. Appl. No. 13/802,154, dated Mar. 31, 2017, 7 pages.
Notice of Allowance for U.S. Appl. No. 13/802,154 dated Aug. 24, 2017, 13 pages.
Faruqui et al., (RAP), "Time-Varying and Dynamic Rate Design" published by www.raponline.org on Jul. 2012, entire document, 52 pages.
Goyal et al, Occupancy-Based Zone-Climate Control for Energy-Efficient Buildings: Complexity vs. Performance, Department of Mechanical and Aerospace Engineering, University of Florida, Aug. 3, 2012, 31 pages.
Qin et al., A survey of industrial model predictive control technology, Control Engineering Practices II, 2003, pp. 733-764.
Rawlings, James B., Tutorial Overview of Model Predictive Control, IEEE Control Systems Magazine, Jun. 2000, pp. 38-52.
Wan et al., The Unscented Kalman Filter for Nonlinear Estimation, IEEE 2000, pp. 153-158.
US Office Action on U.S. Appl. No. 14/970,187 dated Feb. 23, 2018. 17 pages.

* cited by examiner

SYSTEMS AND METHODS FOR ENERGY COST OPTIMIZATION IN A BUILDING SYSTEM

CROSS REFERENCE TO RELATED PATENT APPLICATION

This application is a continuation of U.S. application Ser. No. 13/802,279 filed Mar. 13, 2013, the entire disclosure of which is incorporated by reference herein.

BACKGROUND

The present application relates to systems and methods for minimizing energy cost in response to time-varying pricing scenarios. The systems and methods described herein may be used for demand response in building or HVAC systems such as those sold by Johnson Controls, Inc.

The rates that energy providers charge for energy often vary throughout the day. For example, energy providers may use a rate structure that assigns different energy rates to on-peak, partial-peak, and off-peak time periods.

Additionally, energy providers often charge a fee known as a demand charge. A demand charge is a fee corresponding to the peak power (i.e. the rate of energy use) at any given time during a billing period. In a variable pricing scenario that has an on-peak, partial-peak, and off-peak time period, a customer is typically charged a separate demand charge for maximum power use during each pricing period.

Energy providers can also offer customers the option to participate in a critical-peak pricing (CPP) program. In a CPP program, certain days throughout a billing period are designated as CPP days. On a CPP day, the on-peak time period is often divided in two or more sub-periods. CPP periods may also have separate demand charges for each sub-period. As an incentive to participate in the CPP program, customers are charged a lower energy rate on non-CPP days during the billing period.

Energy providers also often engage in real-time pricing (RTP). RTP energy rates change frequently and can vary quite drastically throughout the day. RTP periods may also have a separate demand charge for each RTP period. It is challenging and difficult for energy customers would like to minimize the cost that they pay for energy where pricing scenarios can be mixed.

Control actions can be taken to respond to variable pricing scenarios. One response is to turn off equipment. However, when the energy is used to drive a heating or cooling system for a building, the cost minimization problem is often subject to constraints. For example, it is desirable to maintain the building temperature within an acceptable range. Methods that are more proactive include storing energy in batteries or using ice storage to meet the future cooling loads. A problem with many of these techniques is the requirement for large, expensive, and non-standard equipment.

A method that does not require additional equipment is storing energy in the thermal mass of the building. This form of thermal energy storage risks leading to either uncomfortable building zone temperatures or demand charges that are not significantly reduced. One technique is to pre-cool the building to a minimum allowable temperature and to determine the temperature setpoint trajectory that will minimize power use while maintaining the temperature below a maximum allowable value. With this technique, the demand can be curtailed and the zone temperature can remain within temperature comfort bounds.

Traditional methods are less than optimal and are unable to handle RTP pricing scenarios with rapidly changing energy prices or CPP pricing scenarios having several regions of interest for both energy and demand charges. Furthermore, traditional methods may have difficulty accounting for varying disturbances to the system or changes to the system which are likely to necessitate re-developing or retraining the underlying model.

Energy cost minimization systems and methods are needed to address a plurality of variable pricing schemes including the rapidly changing energy cost structures of CPP and RTP. Additionally, a method is needed which handles the possibility of multiple demand charge regions and which handles varying disturbances and changes to the system without the need to re-train the model.

SUMMARY

One implementation of the present disclosure is a method for minimizing energy cost in a building system. The method includes receiving an energy model for the building system, system state information, and a cost function, and using an optimization procedure to determine an optimal power usage. The energy model may describe energy characteristics of the building system, the system state information may describe a condition of the building system, and the energy cost function may use time-varying pricing information for a plurality of pricing periods to determine a total energy cost as a function of power usage. The optimal power usage determined by the optimization function may minimize the total energy cost for the building system.

In some embodiments, the method may further include receiving temperature constraints and using the system model and the system state information to formulate equality constraints. Equality constraints may describe energy characteristics of the building system and the optimization procedure may determine an optimal power usage subject to the equality constraints and the temperature constraints.

In some embodiments, the method may further include expressing the cost function as a linear equation by imposing demand charge constraints on the optimization procedure. The optimization procedure may determine an optimal power usage subject to the demand charge constraints. A masking procedure may be used to invalidate any demand charge constraint which applies to an inactive pricing period. A demand charge constraint applies to an inactive pricing period if the time-step to which the demand charge constraint applies does not occur during the pricing period to which the demand charge constraint applies.

In some embodiments, the plurality of pricing periods may include at least two of off-peak, partial-peak, peak, critical-peak, and real-time or may include at least one of critical-peak and real-time. In some embodiments, the time-varying pricing information may include demand charge information defining a cost per unit of power corresponding to a maximum power usage within a pricing period. The energy cost function may also include demand charge information and may be expressed as a linear equation. The time-varying pricing information may further include energy charge information defining a cost per unit of energy.

In some embodiments, the energy model may be an inner loop model or an outer loop model for a cascaded model predictive control system or may be a stochastic state space model with variable system parameters.

Another implementation of the present disclosure is a method for determining an energy cost for a building system. The method includes receiving time-varying pricing information for a plurality of pricing periods, receiving a time horizon, and using the time-varying pricing information and the time horizon to express a total cost of energy for the building system as a function of an estimated power usage within the time horizon. The time varying pricing information may include demand charge information defining a cost per unit of power corresponding to a maximum power usage within a pricing period.

In some embodiments, the method may further include expressing the cost function as a linear equation by imposing demand charge constraints on an optimization procedure and using a masking procedure to invalidate any demand charge constraint which applies to an inactive pricing period.

Yet another implementation of the present disclosure is a recursive method of minimizing energy cost in a building system including receiving an energy model for the building system and system state information, receiving an energy cost function and temperature constraints, using the energy model to formulate equality constraints describing energy characteristics of the building system, using the system state information to formulate demand charge constraints, using an optimization procedure to minimize the total energy cost while satisfying the equality constraints, the temperature constraints, and the demand charge constraints, updating the energy model and system state information, and repeating the 'using' and 'updating' steps recursively. The energy model may describe energy characteristics of the building system and the energy cost function may use time-varying pricing information for a plurality of pricing periods to determine a total energy cost. In some embodiments, the recursive method may further include using a masking procedure to invalidate any demand charge constraint which applies to an inactive pricing period.

Yet another implementation of the present disclosure is a control system to minimize energy cost in a building system including a controller configured to receive an energy model for a building system, system state information, temperature constraints, and time-varying pricing information for a plurality of pricing periods, use the energy model and system state information to formulate equality constraints and demand charge constraints, and determine a setpoint which minimizes an energy cost over a time horizon while satisfying the temperature constraints, the equality constraints, and the demand charge constraints.

Yet another implementation of the present disclosure is a cascaded control system to minimize energy cost in a building system including an outer controller configured to receive system state information and time-varying pricing information for a plurality of pricing periods including at least two of off-peak, partial-peak, peak, critical-peak, and real-time and to output a first quantity, and an inner controller configured to receive system state information and a setpoint and to output a second quantity. In some embodiments, the system state information may include building temperature information and building power usage information.

In some embodiments, the outer controller of the cascaded control system may be configured to receive an energy model for the building system and temperature constraints, use the energy model and the system state information to formulate equality constraints, use the system state information to formulate demand charge constraints, and determine an optimal power usage which minimizes an energy cost over a time horizon while satisfying the temperature constraints, the equality constraints, and the demand charge constraints. The optimal power usage output by the outer controller may be the first quantity received by the inner controller. In other embodiments first quantity may be an amount of power to defer from a predicted power usage or the setpoint and the second quantity may be a temperature setpoint or a derivative of a temperature setpoint.

In some embodiments outer controller and the inner controller may have different sampling and control intervals. The sampling and control interval for the outer controller may be longer than the sampling and control interval for the inner controller and in some embodiments the inner controller and outer controller may be physically decoupled in location. In some embodiments, the time-varying pricing information may include energy charge information defining a cost per unit of energy or demand charge information defining a cost per unit of power corresponding to a maximum power usage within a pricing period.

DETAILED DESCRIPTION

Figure 1:
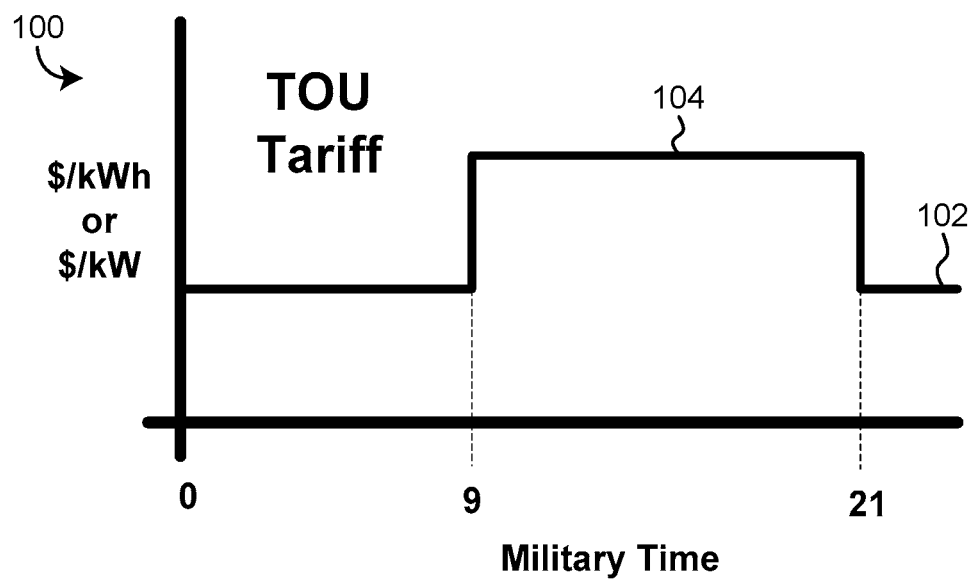
FIG. 1 is a chart illustrating an exemplary "time of use" energy rate structure in which the cost of energy depends on the time of use.

Referring to FIG. 1, a chart 100 illustrating "time of use" (TOU) energy pricing is shown, according to an exemplary embodiment. In a TOU pricing scheme, an energy provider may charge a baseline price 102 for energy used during an off-peak period and a relatively higher price 104 for energy used during an on-peak period. For example, during an off-peak period, energy may cost $0.10 per kWh whereas during an on-peak period, energy may cost $0.20 per kWh. Energy cost may be expressed as a cost per unit of energy using any measure of cost and any measure of energy (e.g., $/kWh, $/J, etc.).

Figure 2:
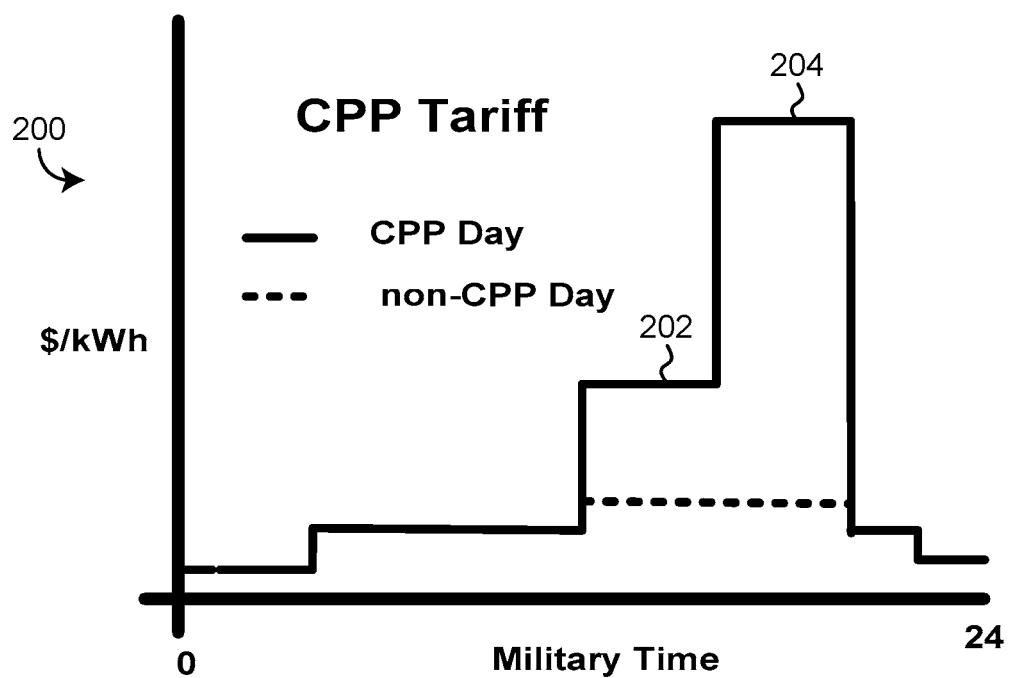
FIG. 2 is a chart illustrating an exemplary critical-peak pricing structure with multiple pricing levels within the critical peak pricing period.

Referring now to FIG. 2, a chart 200 illustrating a critical-peak pricing (CPP) structure is shown, according to an exemplary embodiment. In a CPP pricing scenario, a high price 204 may be charged for energy used during the CPP period. For example, an energy provider may charge two to ten times the on-peak energy rate 202 during a CPP period. Certain days in a billing cycle may designated as CPP days and the CPP period may be divided in two or more sub-periods. CPP periods may also have separate demand charges for each sub-period.

Figure 3:
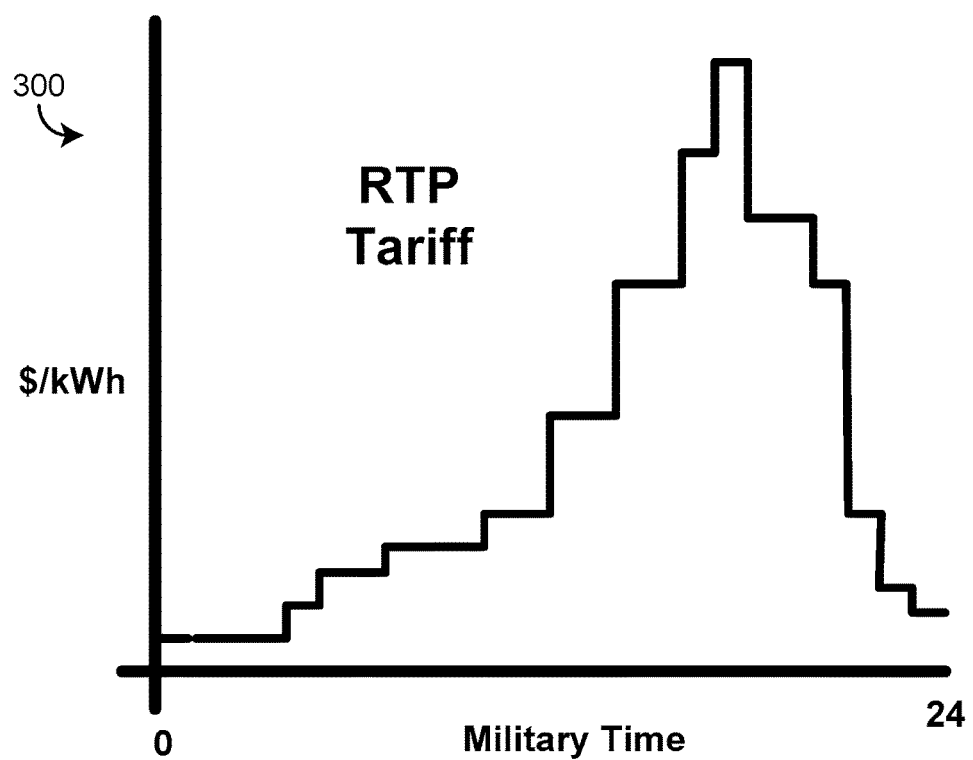
FIG. 3 is a chart illustrating an exemplary real-time pricing structure with many different price levels and a rapidly changing energy cost.

Referring now to FIG. 3, a chart 300 illustrating a real-time pricing structure is shown, according to an exemplary embodiment. In an RTP structure, energy cost may change as often as once per fifteen minutes and may vary significantly throughout a day or throughout a billing cycle. The systems and methods described herein may be used to minimize energy cost in a building system subject to time-varying energy prices.

Figure 4:
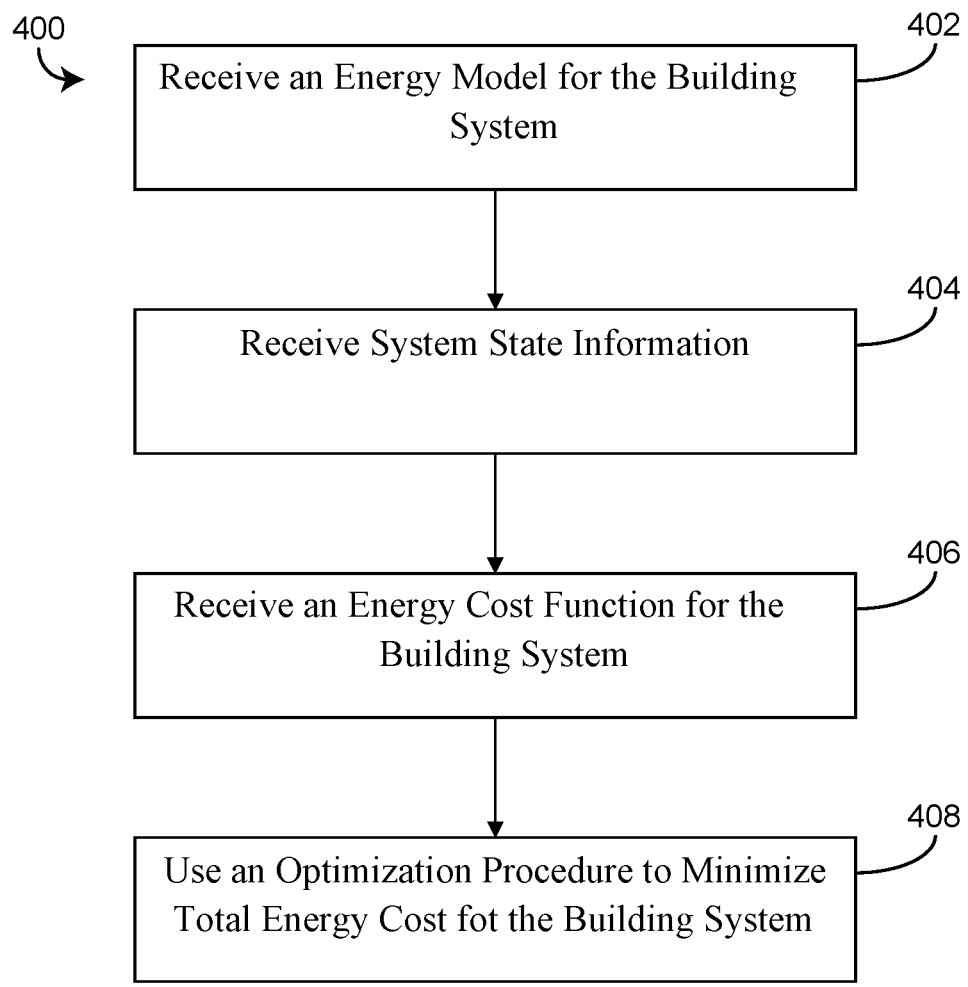
FIG. 4 is a flow chart of a process for minimizing the cost of energy in response to a variable energy pricing structure, according to an exemplary embodiment.

Referring now to FIG. 4, a flowchart illustrating a process 400 of minimizing energy cost in a building system is shown, according to an exemplary embodiment. Process 400 is shown to include receiving an energy model for the building system (step 402), receiving system state information (e.g., measurements or estimates of current conditions in the building system such as temperature, power use, etc.) (step 404), receiving an energy cost function for the building system (step 406), and using an optimization procedure to minimize the total energy cost for the building system (step 408).

As stated above with reference to FIG. 4, process 400 includes receiving an energy model for the building system (step 402). The energy model for the building system (i.e., the system model) may be a mathematical representation of the building system and may be used to predict how the system will respond to various combinations of manipulated inputs and uncontrolled disturbances. For example, the energy model may be used to predict the temperature or power usage of the building in response to a power or temperature setpoint (or other controlled variable).

The energy model may describe the energy transfer characteristics of the building. Energy transfer characteristics may include physical traits of the building which are relevant to one or more forms of energy transfer (e.g., thermal conductivity, electrical resistance, etc.). Additionally, the energy model may describe the energy storage characteristics of the building (e.g., thermal capacitance, electrical capacitance, etc.) as well as the objects contained within the building. The energy transfer and energy storage characteristics of the building system may be referred to as system parameters.

In some embodiments, step 402 may include receiving a pre-defined system model including all the information needed to accurately predict the building's response (e.g., all the system parameters). In other embodiments, step 402 may include developing the model (e.g., by empirically determining the system parameters).

Step 402 may include formulating a system of equations to express future system states and system outputs (e.g., future building temperature, future power usage, etc.) as a function of current system states (e.g., current building temperature, current power usage, etc.) and controllable system inputs (e.g., a power setpoint, a temperature setpoint, etc.). Step 402 may further include accounting for disturbances to the system (e.g., factors that may affect future system states and system outputs other than controllable inputs), developing a framework model using physical principles to describe the energy characteristics of the building system in terms of undefined system parameters, and obtaining system parameters for the framework model. Step 402 may be accomplished using process 500, described in greater detail in reference to FIG. 5.

Still referring to FIG. 4, method 400 may include receiving system state information (step 404). Receiving system state information may include conducting and/or receiving measurements or estimates of current building conditions (i.e., current states of the building system) such as building temperature, building power use, etc). System state information may include information relating to directly measurable system states or may include estimated or calculated quantities. Materials within the building may have a thermal capacitance and therefore may be used to store a thermal load (e.g., a heating or cooling load). System state information may include an estimation of an amount of heat currently stored by the capacitive objects within the building.

Still referring to FIG. 4, method 400 may include receiving an energy cost function for the building system (step 406). The energy cost function may be used to calculate a total energy cost within a finite time horizon. Current system state information (e.g., measurements of current power usage) as well as predicted future system states (e.g., estimated future power usage) may be used in combination with time-varying price information for one or more pricing periods (e.g., off-peak, on-peak, critical peak, etc.) to calculate a total cost of energy based on a predicted energy usage.

In some embodiments, step 406 may include receiving a pre-defined cost function including all of the information necessary to calculate a total energy cost. A pre-defined cost function may be received from memory (e.g., computer memory or other information storage device), specified by a user, or otherwise received from any other source or process.

In other embodiments, step 406 may include defining one or more terms in the cost function using a cost function definition process. Step 406 may include receiving time-varying pricing information for a plurality of pricing periods. Time-varying pricing information may include energy cost information (e.g., price per unit of energy) as well as demand charge information (e.g., price per unit of power) corresponding to a maximum power use within a pricing period. Step 406 may further include receiving a time horizon within which energy cost may be calculated and expressing the total cost of energy within the time horizon as a function of estimated power use. Predicted future power use may be used in combination with energy pricing information for such periods to estimate the cost future energy use. Step 406 may further include expressing the cost function as a liner equation by adding demand charge constraints to the optimization procedure and using a masking procedure to invalidate demand charge constraints for inactive pricing periods. Step 406 may be accomplished using a cost function definition process such as process 1300, described in greater detail in reference to FIG. 13.

Still referring to FIG. 4, method 400 may include using an optimization procedure to minimize the total energy cost for the building system (step 408). Step 408 may include receiving temperature constraints, using the energy model and the system state information to formulate equality constraints, and determining an optimal power usage or setpoint to minimize the total cost of energy within a finite time horizon (e.g., minimize the energy cost determined by the cost function) while maintaining building temperature within acceptable bounds. Equality constraints may used to guarantee that the optimization procedure considers the physical realities of the building system (e.g., energy transfer principles, energy characteristics of the building, etc.) during cost minimization. In other words, equality constraints may be used to predict the building's response (e.g., how the system states and outputs will change) to a projected power usage or temperature setpoint, thereby allowing the energy cost function to be minimized without violating the temperature constraints. Step 408 may be accomplished using an optimization process such as process 1500 described in greater detail in reference to FIG. 15.

Figure 5A:
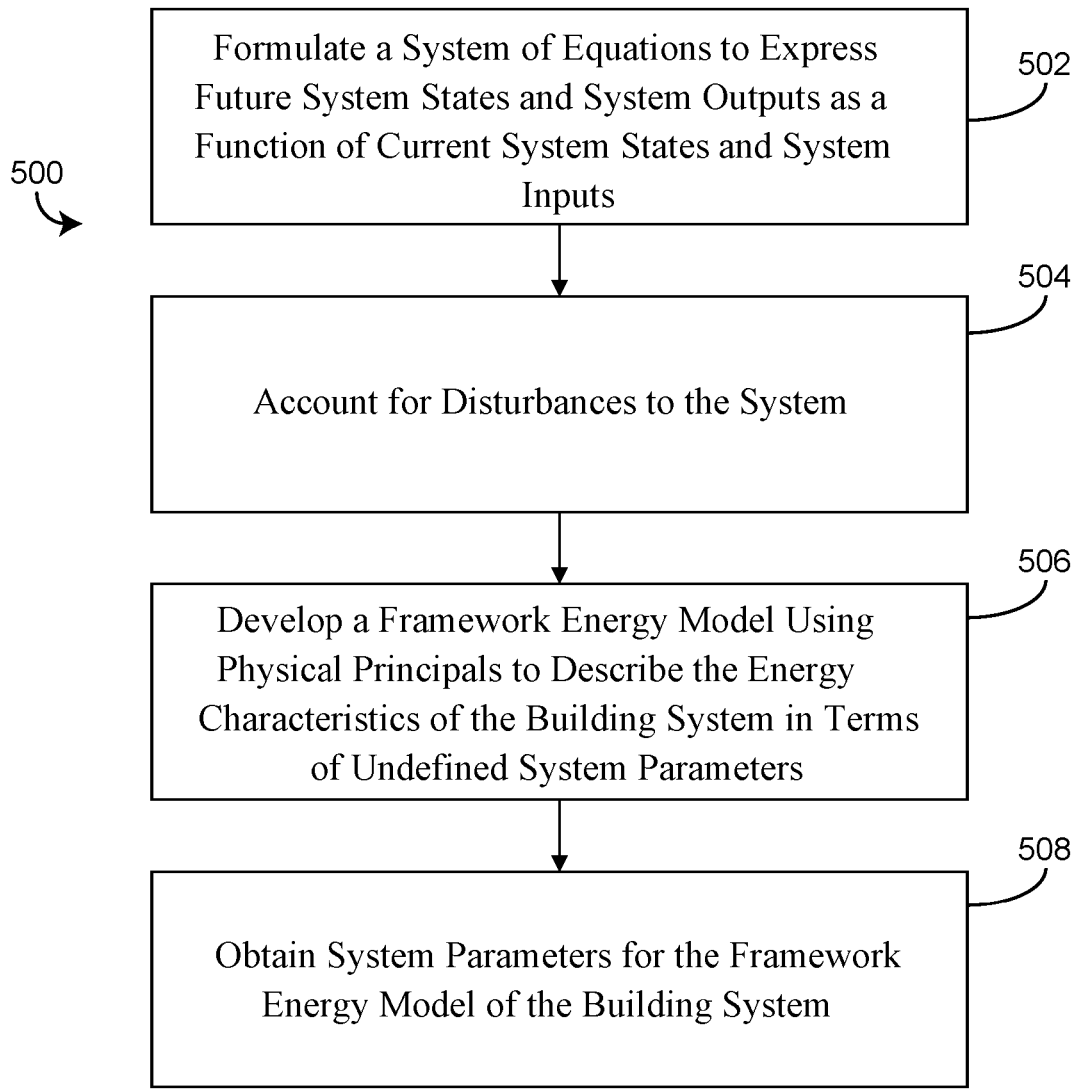
FIG. 5A is a flowchart of a process for developing a framework energy model for a building system and obtaining system parameters for the framework energy model, according to an exemplary embodiment, according to an exemplary embodiment.

Referring now to FIG. 5A, a flowchart illustrating a process 500 to develop an energy model for the building system is shown, according to an exemplary embodiment. Process 500 may be used to accomplish step 402 of method 400. Process 500 may include formulating a system of equations to express future system states and system outputs (e.g., future building temperature, future power use, etc.) as a function of current system states (e.g., current building temperature, current power use, etc.) and controllable inputs to the system (e.g., a power setpoint, a temperature setpoint, or other manipulated variables) (step 502). Process 500 may further include accounting for disturbances to the system (e.g., factors other than controllable inputs) such as outside temperature or weather conditions that may affect future system states and system outputs (step 504). Additionally, process 500 may include developing a framework model using physical principles to describe the energy characteristics of the building system in terms of undefined system parameters (step 506), and obtaining system parameters for the framework model (step 508).

Still referring to FIG. 5A, process 500 may include formulating a system of equations to express future system states and system outputs as a function of current system states and controllable system inputs (step 502). In an exemplary embodiment, a state space representation is used to express future system states and system outputs in discrete time as a function current system states and inputs to the system 502. However, step 502 may include formulating any type of equation (e.g., linear, quadratic, algebraic, trigonometric, differential, etc.) to express future system states. In the example embodiment, a state space modeling representation may be expressed in discrete time as:

$$x(k+1)=Ax(k)+Bu(k)$$

$$y(k)=Cx(k)+Du(k)$$

where x represents the states of the system, u represents the manipulated variables which function as inputs to the system, and y represents the outputs of the system. Time may be expressed in discrete intervals (e.g., time-steps) by moving from a time-step k to the next time-step k+1.

In the exemplary embodiment, the state space system may be characterized by matrices A, B, C, and D. These four matrices may contain the system parameters (e.g., energy characteristics of the building system) which allow predictions to be made regarding future system states. In some embodiments, the system parameters may be specified in advance, imported from a previously identified system, received from a separate process, specified by a user, or otherwise received or retrieved. In other embodiments, system matrices A, B, C, and D may be identified using a system identification process, described in greater detail in reference to FIG. 11.

In further embodiments, the system parameters may be adaptively identified on a recursive basis to account for changes to the building system over time. A recursive system identification process is described in greater detail in reference to FIG. 12. For example, a state space representation for a system with changing model may be expressed as:

$$x(k+1)=A(\theta)x(k)+B(\theta)u(k)$$

$$y(k)=C(\theta)x(k)+D(\theta)u(k)$$

where θ represents variable parameters in the system. A change to the physical geometry of the system (e.g., knocking down a wall) may result in a change to the system parameters. However, a change in disturbances to the system such as heat transfer through the exterior walls (e.g., a change in weather), heat generated from people in the building, or heat dissipated from electrical resistance within the building (e.g., a load change) may not result in a change to the system parameters because no physical change to the building itself has occurred.

Still referring to FIG. 5A, process 500 may include accounting for disturbances to the system (step 504). Disturbances to the system may include factors such as external weather conditions, heat generated by people in the building, or heat generated by electrical resistance within the building. In other words, disturbances to the system may include factors having an impact on system states (e.g., building temperature, building power use, etc.) other than controllable inputs to the system. While accounting for disturbances represents a departure from the deterministic state space model, a more robust solution in the presence of disturbances can be achieved by forming a stochastic state space representation.

In some embodiments, an observer-based design may be used to allow an estimation of the system states which may not be directly measurable. Additionally, such a design may account for measurement error in system states which have a noise distribution associated with their measurement (e.g., an exact value may not be accurately measurable). The stochastic state space representation for a system can be expressed as:

$$x(k+1)=A(\theta)x(k)+B(\theta)u(k)+w(k)$$

$$y(k)=C(\theta)x(k)+D(\theta)u(k)+v(k)$$

$$w(k)\sim N(0,Q) v(k)\sim N(0,R)$$

where w and v are disturbance and measurement noise variables. The solution to this state estimation problem may be given by the function:

$$\hat{x}(k+1|k)=A(\theta)\hat{x}(k|k-1)+B(\theta)u(k)+K(\theta)[y(k)-\hat{y}(k|k-1)]$$

$$\hat{y}(k|k-1)=C(\theta)\hat{x}(k|k-1)+D(\theta)u(k),\hat{x}(0;\theta)$$

where K is the Kalman gain and the hat notation $\hat{x}$, $\hat{y}$ implies an estimate of the state and output respectively. The notation (k+1|k) means the value at time step k+1 given the information at time step k. Therefore the first equation reads "the estimate of the states at time step k+1 given the information up to time step k" and the second equation reads "the estimate of the output at time step k given the information up to time step k-1." The estimate of the states and outputs are used throughout the cost minimization problem over the prediction and control horizons.

Still referring to FIG. 5A, process 500 may further include developing a framework energy model of the building system using physical principles to describe the energy characteristics of the system in terms of undefined system parameters (step 506). The framework energy model may include generalized energy characteristics of the building system (e.g., thermal resistances, thermal capacitances, heat transfer rates, etc.) without determining numerical values for such quantities.

In some embodiments, model predictive control (MPC) may be used to develop the framework energy model. MPC is a unifying control methodology that incorporates technologies of feedback control, optimization over a time horizon with constraints, system identification for model parameters, state estimation theory for handling disturbances, and a robust mathematical framework to enable a state of the art controller. An exemplary MPC controller 1700 and diagrams which may develop and use a framework energy model are described in greater detail in reference to FIG. 5B-FIG. 10. In some embodiments a framework energy model for the building system may be developed (step 506) for two or more MPC controllers.

Still referring to FIG. 5A, process 500 may further include obtaining system parameters for the framework energy model of the building system (step 508). In some embodiments, the system parameters may be specified in advance, imported from a previously identified system, received from a separate process, specified by a user, or otherwise received or retrieved. In other embodiments, system parameters are identified using a system identification process such as process 1100, described in greater detail in reference to FIG. 11.

Figure 5B:
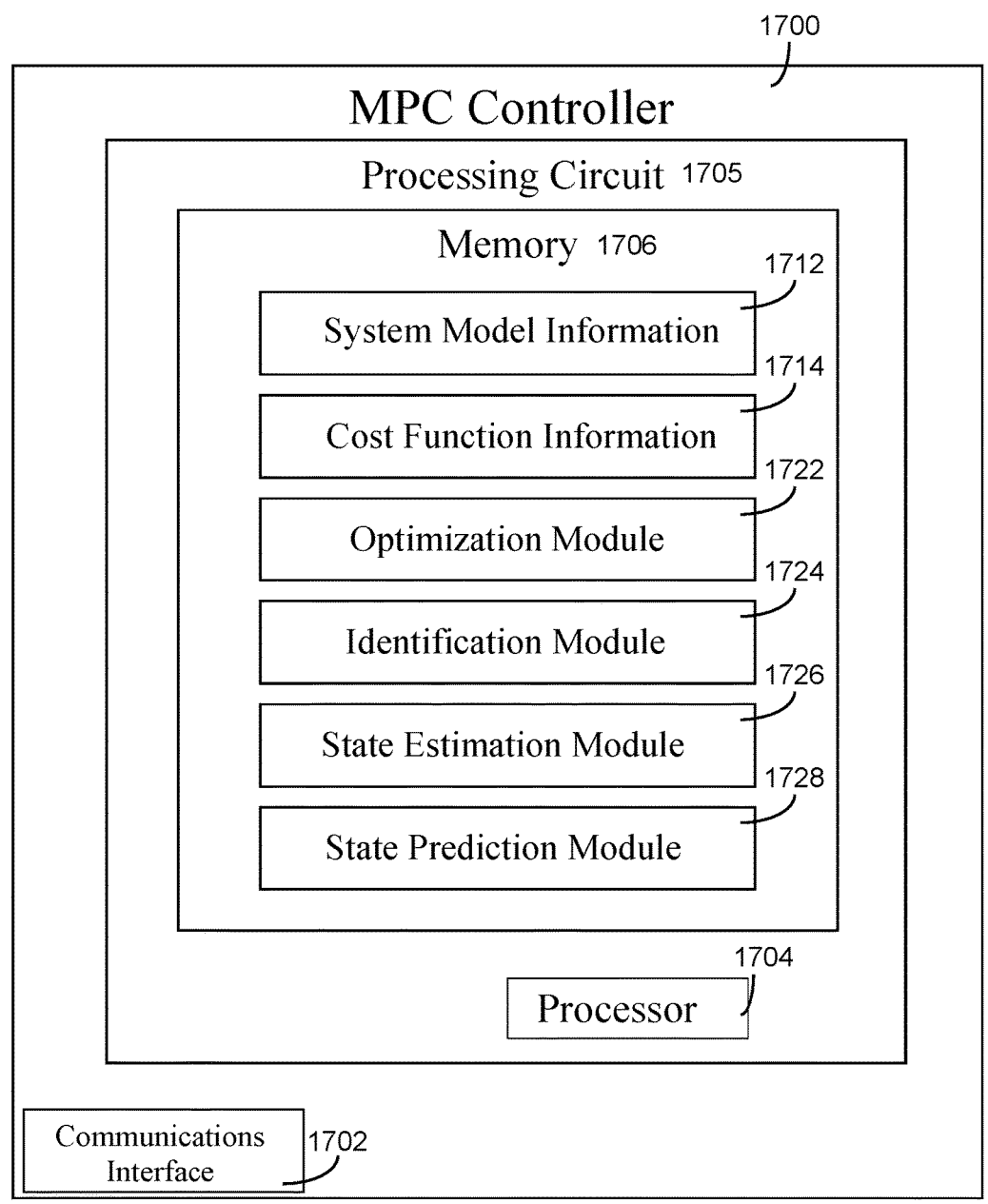
FIG. 5B is a block diagram of a model predictive controller including memory on which instructions for the various processes described herein are contained, a processor for carrying out the processes, and a communications interface for sending and receiving data, according to an exemplary embodiment.

Referring now to FIG. 5B, a block diagram illustrating the components of a MPC controller 1700 is shown, according to an exemplary embodiment. MPC controller 1700 may include a communications interface 1702 for sending and receiving information such as system state information, pricing information, system model information, setpoint information, or any other type of information to or from any potential source or destination. Communications interface 1702 may include wired or wireless interfaces (e.g., jacks, antennas, transmitters, receivers, transceivers, wire terminals, etc.) for conducting data communications with the system or other data sources.

MPC controller 1700 may further include a processing circuit 1705 having a processor 1704 and memory 1706. Processor 1704 can be implemented as a general purpose processor, an application specific integrated circuit (ASIC), one or more field programmable gate arrays (FPGAs), a group of processing components, or other suitable electronic processing components. Memory 1706 may include one or more devices (e.g., RAM, ROM, Flash memory, hard disk storage, etc.) for storing data and/or computer code for completing and/or facilitating the various processes, layers, and modules described in the present disclosure. Memory 1706 may comprise volatile memory or non-volatile memory. Memory 1706 may include database components, object code components, script components, or any other type of information structure for supporting the various activities and information structures described in the present disclosure. According to an exemplary embodiment, the memory 1706 is communicably connected to the processor 1704 and includes computer instructions for executing (e.g., by the processor 1704) one or more processes described herein.

Memory 1706 may include an optimization module 1722 for completing an optimization procedure, an identification module 1724 for performing system identification, a state estimation module 1726 to estimate system states based on the data received via the communications interface 1702, and a state prediction module 1728 to predict future system states.

Memory 1706 may further include system model information 1712 and cost function information 1714. System model information 1712 may be received via the communications interface 1702 and stored in memory 1706 or may be developed by MPC controller 1700 using identification module 1724, processor 1704, and data received via communications interface 1702. System model information 1712 may relate to one or more energy models of a building system and may be used by processor 1704 in one or more processes using state estimation module 1726, state prediction module 1728, or optimization module 1722. Similarly, cost function information 1714 may be received via the communications interface 1702 and stored in memory 1706, or it may be developed by the MPC controller 1700 using data received via the communications interface 1702. Cost function information 1714 may be used by 1704 processor in one or more processes using the system identification module 1724 or optimization module 1722.

In some embodiments, MPC controller 1700 may compensate for an unmeasured disturbance to the system. MPC controller 1700 may be referred to as an offset-free or zero-offset MPC controller. In classical controls, the integral mode in PID controller serves to remove the steady state error of a variable. Similarly, the state space model can be augmented with an integrating disturbance d, as shown in the following equation, to guarantee zero offset in the steady state:

$$\begin{bmatrix} x(k+1) \\ d(k+1) \end{bmatrix} = \begin{bmatrix} A(\theta) & B_D \\ 0 & I \end{bmatrix}\begin{bmatrix} x(k) \\ d(k) \end{bmatrix} + \begin{bmatrix} B(\theta) \\ 0 \end{bmatrix}u(k)+w(k)$$

$$y(k) = \begin{bmatrix} C(\theta) & C_D \end{bmatrix}\begin{bmatrix} x(k) \\ d \end{bmatrix}x(k)+D(\theta)u(k)+v(k)$$

The number of integrating disturbances to introduce may equal the number of measurements needed to achieve zero offset, independent from tuning the controller.

Figure 6:
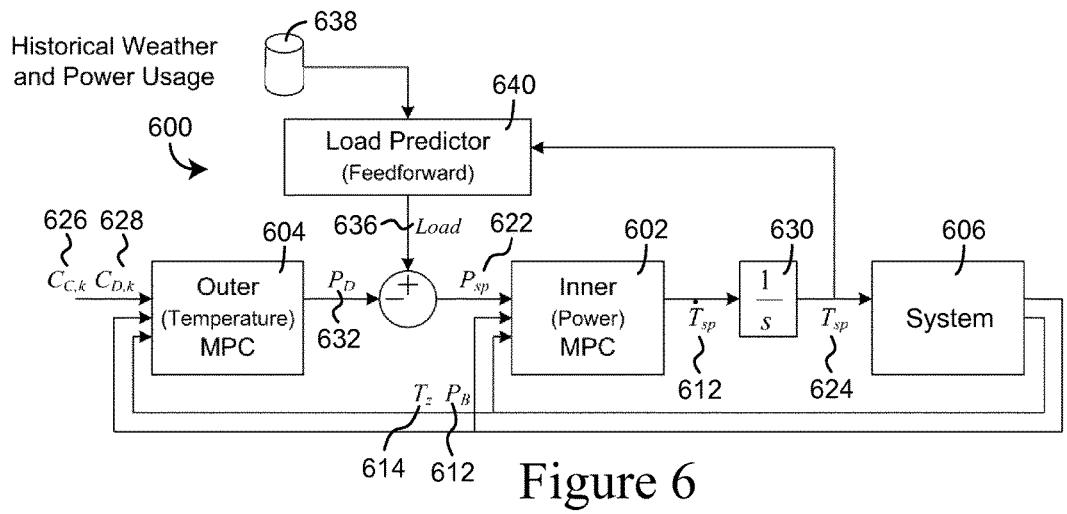
FIG. 6 is a block diagram of a cascaded model predictive control system featuring an inner MPC controller and an outer MPC controller, according to an exemplary embodiment.

Referring now to FIG. 6, a cascaded MPC system 600 is shown, according to an exemplary embodiment. System 600 may include an inner MPC controller 602 and an outer MPC controller 604. Inner MPC controller 606 may function within an inner control loop contained within an outer control loop. This inner-outer control loop architecture may be referred to as a "cascaded" control system.

Cascaded MPC system 600 disclosed herein has several advantages over a single MPC controller. For example, system 600 may allow inner MPC controller 602 to operate at a shorter sampling and control interval to quickly reject disturbances while outer MPC controller 604 may operate at a longer sampling and control interval to maintain optimal power usage. In some embodiments, the sampling and control execution time of inner MPC controller 602 may be around thirty seconds whereas the sampling and control execution time of outer MPC controller 604 may be around fifteen minutes. The choice of fifteen minutes may be driven by a frequency of changes in energy pricing data (e.g., in the real-time pricing rate structure, energy prices may change as frequently as once per fifteen minutes). However, in other embodiments longer or shorter control times may be used.

The cascaded design advantageously permits the development of a less complex energy model than could be achieved with a single comprehensive energy model for the entire building system. Another advantage of the cascaded design is that inner controller 602 and outer controller 604 may be decoupled in location. For example, the outer controller 604 may be implemented off-site or "in the cloud" whereas the inner controller 602 may be run in an on-site building supervisory environment (e.g., a building controller local to a building). In some embodiments, outer controller 604 may receive input from multiple building systems and may interact with multiple inner controllers.

Still referring to FIG. 6, inner MPC controller 602 may be responsible for keeping the building's power use 612 ($P_B$) at a power setpoint 622 ($P_{sp}$) by modulating a temperature setpoint 624 ($T_{sp}$). Inner MPC controller 602 may determine the necessary changes in the temperature setpoint 626 ($\dot{T}_{sp}$). As shown, changes 626 may be integrated through integrator block 630 before being sent to the building system 606 as temperature setpoint 624 ($T_{sp}$). Outer MPC controller 604 may use energy consumption and demand prices, 626 ($C_{C,k}$) and 628 ($C_{D,k}$) respectively, to determine an amount of power that should be deferred 632 ($P_D$). The deferred power 632 may be subtracted from an estimated building load 636. Feed forward predictor 640 may determine the estimated building load 636 using past weather and power use data 638.

The specific input and output variables for both inner MPC controller 602 and outer MPC controller 604 are provided for exemplary purposes only and are not intended to limit the scope of invention further than express limitations included in the appended claims.

Figure 7:
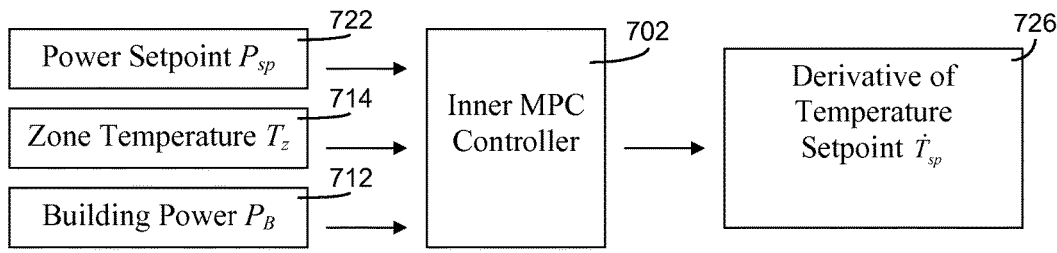
FIG. 7 is a detailed block diagram showing the inputs and outputs of the inner MPC controller, according to an exemplary embodiment.

Referring now to FIG. 7, a diagram illustrating the inputs and outputs for inner MPC controller 602 are shown, according to an exemplary embodiment. Inner MPC controller 702 may receive a power setpoint 722 ($P_{sp}$) as an input. In some embodiments, power setpoint 722 may be an optimal power usage as determined by outer MPC controller 604. In other embodiments, historical weather and power usage data 638 may be used to determine a typical building load 636 (e.g., a predicted or historical amount of energy needed to maintain the building temperature within temperature constraints). If a typical building load 636 is determined, outer MPC controller 604 may be used to determine an amount of power that should be deferred 632. In some embodiments, the amount of deferred power 632 is subtracted from the typical building load 636 before being sent to the inner MPC controller 702 as a power setpoint 722. The amount of deferred power 632 may be positive (e.g., subtracted from the typical building load 636) or negative (e.g., added to the typical building load 636).

Still referring to FIG. 7, inner MPC controller 702 may further receive a zone temperature 714 ($T_z$) as an input. Zone temperature 714 may be a variable representing a state of the system. In a single zone building, zone temperature 714 may be the measured temperature of the single building zone (e.g., a room, floor, area, combination of rooms or floors, etc). In a more complex building with several zones, zone temperature 714 may be a weighted average of the temperatures of multiple building zones. In some embodiments, the weighted average may be based on the area or volume of one or more zones. Additionally, the weighted average may be based on the relative position of the zone temperatures within the demand response temperature range. For example, zone temperature 714 may be calculated as follows:

$$T_z = \sum_i w_i \left( \frac{T_{z,i} - T_{min,i}}{T_{max,i} - T_{min,i}} \right)$$

where w is the weight of a zone and $T_{max}$ and $T_{min}$ represent the minimum and maximum allowable temperatures for that zone. In this case, the variable representing the zone temperatures may be normalized (e.g., between 0 and 1). Zone temperature 714 may be measured directly, calculated from measured quantities (e.g., information representative of a measured temperature), or otherwise generated by the system. Information representative of a measured temperature may be the measured temperature itself or information from which a building temperature may be calculated.

Still referring to FIG. 7, inner MPC controller 702 may further receive a current power usage 712 of the building. Current power usage 712 may be received as a feedback input for inner MPC controller 702. Inner MPC controller 702 may attempt to control current power usage 712 to match power setpoint 722. In the exemplary embodiment, current power usage 712 is an amount of power currently used by the building. However, in other embodiments, power usage 712 may represent any other state of the system, depending on the variable or variables sought to be controlled. Power usage 712 may be measured directly from the building system, calculated from measured quantities, or otherwise generated by any other method or process.

Still referring to FIG. 7, inner MPC controller 702 may output the derivative of a temperature setpoint $\dot{T}_{sp}$ 726. The derivative of the temperature setpoint 726 may be used by inner MPC controller 702 to control power usage 712. In a simple single-zone building, $\dot{T}_{sp}$ 726 may be a rate at which the temperature setpoint 624 is to be increased or decreased for the single zone. In multiple-zone buildings, $\dot{T}_{sp}$ 726 may be applied to the respective temperature setpoints for each individual zone. In other embodiments having multiple building zones, $\dot{T}_{sp}$ 726 may be broken into multiple outputs using a weighted average calculation based on the relative positions of the zone temperatures within the demand response range.

In the exemplary embodiment, the derivative of the temperature setpoint 726 may be chosen as the output of the inner MPC controller 702 because the system 606 is expected to perform as a "negative 1" type system. In other words, a step change in the temperature setpoint 624 may cause a very small change in steady-state power usage. Therefore to prevent steady-state offset (or an offset the decays very slowly) the controller 702 may have two integrators. The first integrator may be implicit in the disturbance model of the MPC controller (e.g., included as an integrating disturbance) whereas the second integrator 630 may be explicitly located downstream of inner MPC controller 602, as shown in FIG. 6.

Although the exemplary embodiment uses a derivative of temperature setpoint 726 as the output variable for the inner MPC controller 702, other embodiments may use different output variables or additional output variables.

Figure 8:
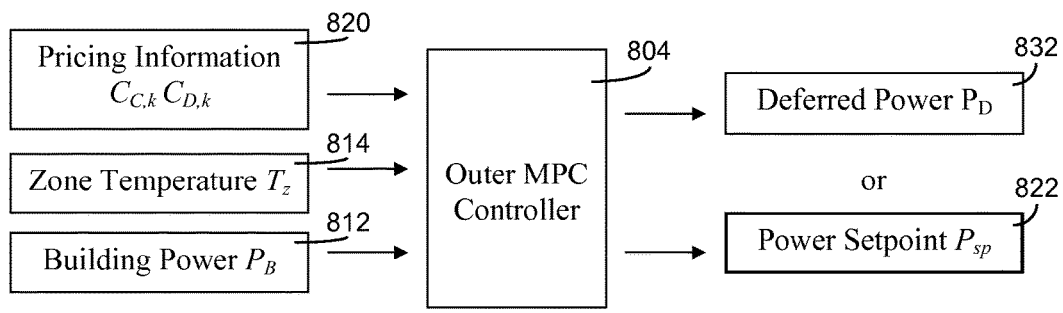
FIG. 8 is a detailed block diagram showing the inputs and outputs of the outer MPC controller, according to an exemplary embodiment.

Referring now to FIG. 8, a diagram illustrating inputs and outputs for outer MPC controller 604 is shown, according to an exemplary embodiment. Outer MPC controller 604 may be responsible for calculating an amount of power to defer 632, based on current and future energy prices 626 and 628, while maintaining building temperature 614 within acceptable bounds. As long the temperature constraints are satisfied, temperature 614 may be allowed to fluctuate. Thus, the goal of the outer MPC controller 604 is to minimize the cost of energy subject to temperature constraints.

Still referring to FIG. 8, outer MPC controller 804 may receive the current zone temperature $T_z$ 814 and the current power usage $P_B$ 812 of the building system. As described in reference to FIG. 7, these two variables represent states of building system 606. Both states may be measured directly, calculated from measured quantities, or otherwise generated by building system 606. In some embodiments, controller 804 may receive information representative of a measured temperature and/or information representative of a measured power usage. Information representative of a measured temperature may be the measured temperature itself or information from which a building temperature may be calculated. Information representative of a measured power usage may be the measured power usage itself or information from which a building power usage may be calculated.

Still referring to FIG. 8, outer MPC controller 804 may further receive pricing information 826 including energy consumption and demand prices, $C_{C,k}$ and $C_{D,k}$ respectively, according to an exemplary embodiment. The electric consumption price $C_{C,k}$ may be the cost per unit of energy consumed (e.g., $/J or $/kWh). $C_{C,k}$ may be applied as a multiplier to the total amount of energy used in a billing cycle, a pricing period, or any other time period to determine an energy consumption cost. The demand price $C_{D,k}$ may be an additional charge corresponding to the peak power (e.g., maximum rate of energy use) at any given time during a billing period. In a variable pricing scenario that has an on-peak, partial-peak, and off-peak time period, a customer may be charged a separate demand charge for the maximum power used during each pricing period. Pricing information 826 may include consumption and demand prices for one or more pricing periods or pricing levels including off-peak, partial-peak, on-peak, critical-peak, real-time, or any other pricing period or pricing level. In some embodiments, pricing information 826 may include timing information defining the times during which the various consumption prices and demand prices will be in effect.

In some embodiments, outer MPC controller 804 may further receive historical weather and power usage data. Historical weather and power usage data may be used to perform a feed-forward estimation of the building's probable power requirements. However, in other embodiments, this estimation may performed by a separate feed-forward module 640, as shown in FIG. 6. In further embodiments, historical weather and power usage data are not considered by the outer MPC controller 804 in determining the optimal power setpoint 822.

Figure 9:
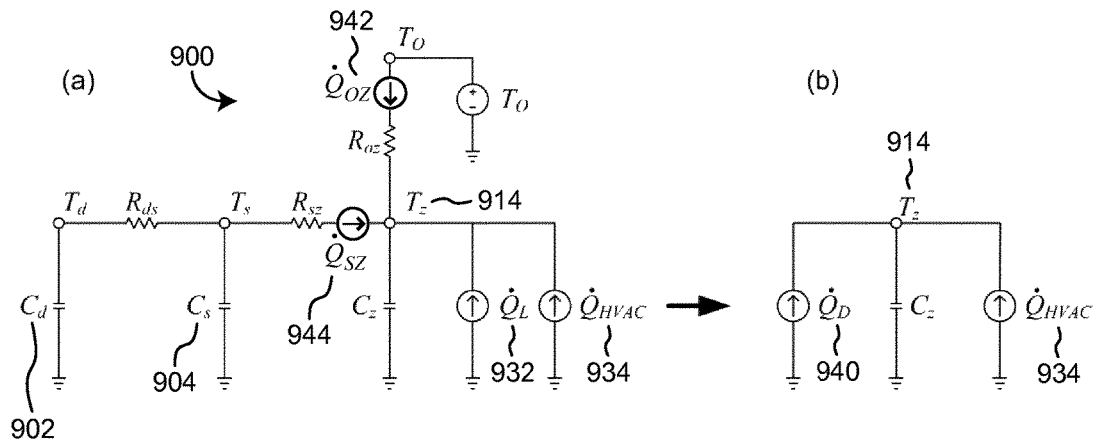
FIG. 9 is an energy balance diagram for formulating an energy model of the building system used by the inner MPC controller, according to an exemplary embodiment.

Referring now to FIG. 9, a energy transfer diagram 900 for building system is shown, according to an exemplary embodiment. Diagram 900 may represent a framework energy model of the building system for the inner MPC controller. In the exemplary embodiment, the building system is modeled in diagram 900 as a single-zone building with a shallow mass and a deep mass. The shallow mass may represent objects and/or materials in the building which have contact with the air inside the building (e.g., immediate wall material, drywall, furniture, floor, ceiling, etc.) whereas the deep mass may represent material which is separated from the air inside the building by the shallow mass (e.g., cement block, foundation, etc.).

Referring specifically to FIG. 9(a), T, C, and R, are used to represent temperatures, capacitances, and resistances, respectively, with the associated subscripts d, s, z, and O representing deep mass, shallow mass, zone air, and outside air, respectively. Also shown is the heat supplied 932 by people and electric resistance within the building ($\dot{Q}_L$), and the heat supplied 934 (or removed in the case of a negative number) by the HVAC system ($\dot{Q}_{HVAC}$).

Referring now to FIG. 9(b), the framework energy model is simplified by eliminating $C_d$, $C_s$, and $\dot{Q}_L$, thereby significantly reducing the number of parameters in the model. A reduced number of parameters may increase the robustness of system identification and reduce the computational effort of the inner MPC controller. Because the major dynamics of the system may be fast compared to the time constants of the deep mass capacitance 902 ($C_d$), the shallow mass capacitance 904 ($C_s$), and the rate of change of the human and electric load 932 ($\dot{Q}_L$), these time varying sources of heat entering the zone temperature node 914 may be treated as a slowly moving disturbance. The slowly moving disturbance 940 may be represented as $\dot{Q}_D$ which includes conduction and convection of outside air 942, heat transfer from the shallow mass 944, and heat generated from people and electrical use inside the building 932.

In the exemplary embodiment, $\dot{Q}_{HVAC}$ 934 may be modeled as the output of a PI controller. Thus, the rate of change in zone temperature may be given by the equation:

$$C_z \dot{T}_z = K_q[K_P(T_{sp}-T_z)+K_I I]+\dot{Q}_D$$

and the integral may be given by:

$$\dot{I}=T_{sp}-T_z$$

Additionally, because $\dot{Q}_{HVAC}$ 934 represents the power delivered to the system, additional equations may be introduced to compensate for the power lost in transportation. For example, in the case of a water cooled building, the energy balance may be maintained by heating water in the building which may be transported to a chiller/tower system where the heat may be expelled into to the atmosphere. In the exemplary embodiment, the transport process that converts the cooling power delivered to the building system to a power use at a cooling tower may be modeled by an over-damped second-order system with one (shorter) time constant $\tau_1$ representing the delay and a second time constant $\tau_2$ representing mass of cooling fluid.

$$\ddot{P}+(\tau_1+\tau_2)\dot{P}+(\tau_1\tau_2)P=P_{ss}$$

$$P_{ss}=K_e[K_p(T_{sp}-T_z)+K_I I]$$

The additional values that have been introduced are defined as follows: P is the power used by the cooling equipment (e.g., at the cooling/chilling towers), $P_B$ is the power usage as measured by the building, $K_q$ is coefficient that converts PID output to heating power, $K_e$ is coefficient that converts PID output to a steady-state power usage by the central plant equipment, and $\tau_1$ and $\tau_2$ are the time constants of the power transport process.

Therefore, in an exemplary embodiment, the entire model needed by the inner MPC controller 602 can be represented by:

$$\begin{bmatrix} \dot{T}_z \\ \dot{I} \\ \dot{P} \\ \ddot{P} \\ \dot{T}_{sp} \\ \dot{P}_{Dist} \end{bmatrix} = \begin{bmatrix} \frac{-K_q K_P}{C_z} & \frac{K_q K_I}{C_z} & 0 & 0 & \frac{K_q K_P}{C_z} & 0 \\ -1 & 0 & 0 & 0 & 1 & 0 \\ 0 & 0 & 0 & 1 & 0 & 0 \\ -K_e K_P & K_e K_I & -\tau_1 \tau_2 & -\tau_1 - \tau_2 & K_e K_P & 0 \\ 0 & 0 & 0 & 0 & 0 & 0 \\ 0 & 0 & 0 & 0 & 0 & 0 \end{bmatrix} \begin{bmatrix} T_z \\ I \\ P \\ \dot{P} \\ T_{sp} \\ P_{Dist} \end{bmatrix} + \begin{bmatrix} 0 & 0 \\ 0 & 0 \\ 0 & 0 \\ 0 & 0 \\ 1 & 0 \\ 0 & 1 \end{bmatrix} \begin{bmatrix} \dot{T}_{sp} \\ \dot{P}_{Dist} \end{bmatrix}$$

$$\begin{bmatrix} T_z \\ P_B \end{bmatrix} = \begin{bmatrix} 1 & 0 & 0 & 0 & 0 & 0 \\ 0 & 0 & 1 & 0 & 0 & 1 \end{bmatrix} \begin{bmatrix} T_z \\ I \\ P \\ \dot{P} \\ T_{sp} \\ P_{Dist} \end{bmatrix}$$

where $\dot{Q}_D$ 940 as well as any power usage by loads other than HVAC equipment may be incorporated into the power disturbance $P_{Dist}$, which may be added to the measured power output $P_B$ 612. Advantageously, modeling $P_{Dist}$ in such a way may allow for offset free control in the presence of slowly changing disturbances.

In the exemplary embodiment, after converting to discrete time and substituting θ variables for the unknown system parameters, the complete inner loop framework energy model may be given by:

$$\begin{bmatrix} T_z(k+1) \\ I(k+1) \\ P(k+1) \\ \dot{P}(k+1) \\ P_{Dist}(k+1) \end{bmatrix} = \begin{bmatrix} 1-\theta_1 & \theta_1 \theta_2 & 0 & 0 & 0 \\ -1 & 1 & 0 & 0 & 0 \\ 0 & 0 & 1 & 1 & 0 \\ -\theta_3 & \theta_2 \theta_3 & -\theta_4 \theta_5 & 1-\theta_4-\theta_5 & 0 \\ 0 & 0 & 0 & 0 & 0 \end{bmatrix} \begin{bmatrix} T_z(k) \\ I(k) \\ P(k) \\ \dot{P}(k) \\ P_{Dist}(k) \end{bmatrix} + \begin{bmatrix} \theta_1 \\ 1 \\ 0 \\ \theta_3 \\ 0 \end{bmatrix} T_{sp}(k)$$

$$\begin{bmatrix} T_z(k) \\ P_B(k) \end{bmatrix} = \begin{bmatrix} 1 & 0 & 0 & 0 & 0 \\ 0 & 0 & 1 & 0 & 1 \end{bmatrix} \begin{bmatrix} T_z(k) \\ I(k) \\ P(k) \\ \dot{P}(k) \\ P_{Dist}(k) \end{bmatrix}$$

Although the discrete time model shows $P_{Dist}$ as a constant, a Kalman gain (used in the state estimation process) may be used to optimally convert measurement errors to state estimation error, thereby causing $P_{Dist}$ to change.

Figure 10:
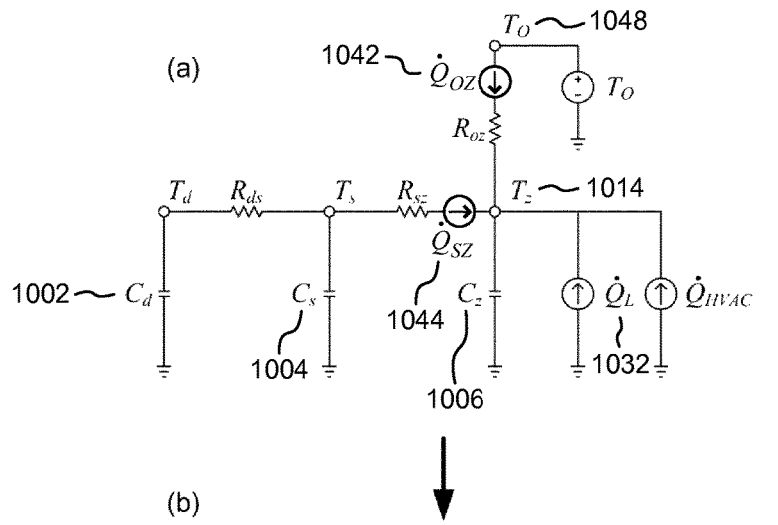
FIG. 10 is an energy balance diagram for formulating an energy model of the building system used by the outer MPC controller, according to an exemplary embodiment.
Figure 10:
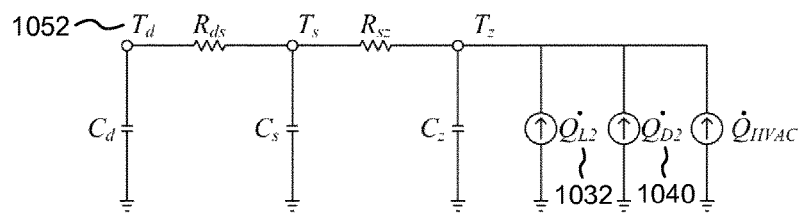

Referring now to FIG. 10, an energy transfer diagram 1000 for building system is shown, according to an exemplary embodiment. Diagram 1000 may represent a framework energy model of the building system for the outer MPC controller. Referring specifically FIG. 10(a), a complete energy diagram for the outer loop framework energy model is shown, according to an exemplary embodiment. For the outer control loop, all forms of capacitance 1002, 1004, and 1006 in the building may be included in the model because it may no longer be sufficient to treat the heat transfer from the shallow mass 1044 as a slowly moving disturbance. For example knowledge of the states of these capacitors and how heat is transferred between them may be relevant to a prediction of how zone temperature 1014 will change. In other words, an objective of the outer loop model may be to predict the state of these capacitors.

Referring now to FIG. 10(b), a simplified energy diagram for the outer loop framework energy model is shown. Two simplifying assumptions may be made in converting the complete energy diagram (FIG. 10(a)) to the simplified energy diagram (FIG. 10(b)). First, it may be assumed that the energy transferred through external conduction and convection 1042 and the typical load profile at a constant setpoint $\dot{Q}_{L2}$ 1032 can be estimated based on time of day and temperature difference between the outside air temperature 1048 and the zone 1014 (e.g., $T_o - T_z$). Estimation may performed by the feed forward load predictor 640 shown in FIG. 6. The random portion of the load profile (e.g., the portion that is independent of time of day and temperature difference) may be represented an integrated disturbance $\dot{Q}_{D2}$ 1040.

Second, in an exemplary embodiment, energy transfer equations describing the model shown in FIG. 10(b) may be expressed as:

$$C_z \dot{T}_z = \frac{T_s - T_z}{R_{sz}} + \dot{Q}_{L2} + \dot{Q}_{D2} + \dot{Q}_{HVAC}$$

$$C_s \dot{T}_s = \frac{T_d - T_s}{R_{ds}} + \frac{T_z - T_s}{R_{sz}}$$

$$C_s \dot{T}_s = \frac{T_d - T_s}{R_{ds}} + \frac{T_z - T_s}{R_{sz}}$$

To convert these equations to the framework energy model used by outer MPC controller 604, the heat transfers may be converted to powers that can be measured at the meter by assuming a constant of proportionality between the two. For example, $\dot{Q}_{HVAC}$ may be converted to $P_{HVAC}$ by multiplying by a coefficient of performance.

In the exemplary embodiment, inputs to the outer MPC controller 604 may be divided into controllable inputs, measured disturbances (e.g., uncontrollable but measurable inputs), and unmeasured disturbances (e.g., uncontrollable and unmeasured inputs). To make this division, the inputs may be reformulated to $P_C$ (e.g., the power required to keep the zone temperature constant) and $P_D$ (e.g., the deferred power). $P_D$ may be a controllable input because it may be possible to control the amount of power to defer. $P_C$ may be a measured disturbance because it may be possible to estimate the power required maintain a constant building temperature based the difference between outdoor air temperature and the temperature within the building. In some embodiments, estimation of $P_C$ ($P_{L2}$ and the portion of $P_{HVAC}$ that comes from a constant setpoint) may be performed in a feed forward fashion as shown in FIG. 6. Finally, $P_{D2}$ may be an unmeasured disturbance and can be viewed as the estimation error in $P_C$. Thus, the framework energy model of the building system used by the outer MPC controller may be expressed as:

$$\begin{bmatrix} \dot{T}_d \\ \dot{T}_s \\ \dot{T}_z \\ \dot{P}_{D2} \end{bmatrix} = \begin{bmatrix} \frac{-1}{R_{ds}C_d} & \frac{1}{R_{ds}C_d} & 0 & 0 \\ \frac{1}{R_{ds}C_s} & -\left(\frac{1}{R_{ds}C_s}+\frac{1}{R_{sz}C_s}\right) & \frac{1}{R_{sz}C_s} & 0 \\ 0 & \frac{1}{R_{sz}C_z} & \frac{-1}{R_{sz}C_z} & K_1 \\ 0 & 0 & 0 & 0 \end{bmatrix}$$

$$\begin{bmatrix} T_d \\ T_s \\ T_z \\ P_{D2} \end{bmatrix} + \begin{bmatrix} 0 & 0 & 0 \\ 0 & 0 & 0 \\ K'_2 & 0 & 0 \\ 0 & 0 & 1 \end{bmatrix} \begin{bmatrix} P_D \\ P_C(T_{OA}-T_z,t) \\ \dot{P}_{D2} \end{bmatrix}$$

$$\begin{bmatrix} T_z \\ P_B \end{bmatrix} = \begin{bmatrix} 0 & 0 & 1 & 0 \\ 0 & 0 & 0 & 1 \end{bmatrix} \begin{bmatrix} T_d \\ T_s \\ T_z \\ P_{D2} \end{bmatrix} + \begin{bmatrix} 0 & 0 & 0 \\ -1 & 1 & 0 \end{bmatrix} \begin{bmatrix} P_D \\ P_C(T_{OA}-T_z,t) \\ \dot{P}_{D2} \end{bmatrix}$$

Advantageously, in the exemplary embodiment, $P_C$ may be a function of a state of the building system (e.g., $P_C = f(T_{OA}-T_z,t)$). This is a condition that many MPC implementations would not support. The alternative would be to perform feed forward estimation outside the MPC controller. However, this is suboptimal because the feed forward estimator would be unable predict how altering the setpoint 622 would affect $P_C$ because it would have no information regarding the current or predicted zone temperature $T_z$ 1014. For example, presently deferring power will result in the zone temperature 1014 becoming closer to the outside temperature 1048, thereby decreasing the rate of heat transfer 1042 through the walls of the building. By incorporating the load predictor into the MPC controller, this change can be predicted and $P_c$ can be adjusted accordingly.

In the exemplary embodiment, the outer loop model can be simplified further by assuming that changes in the deep mass temperature 1052 ($T_d$) occur at a rate that is much slower than the length of time power use can be deferred. With this assumption, the temperature of the deep mass 1052 may be considered a known input and the framework energy model used by outer MPC controller 604 may be expressed as:

$$\begin{bmatrix} T_s(k+1) \\ T_z(k+1) \\ P_{D2}(k+1) \end{bmatrix} =$$

-continued $$\begin{bmatrix} 1-(\theta_1+\theta_2) & \theta_2 & 0 \\ \theta_3 & -\theta_3 & \theta_4 \\ 0 & 0 & 1 \end{bmatrix} \begin{bmatrix} T_s(k) \\ T_z(k) \\ P_{D2}(k) \end{bmatrix} + \begin{bmatrix} \theta_1 & 0 & 0 \\ 0 & \theta_4 & 0 \\ 0 & 0 & 0 \end{bmatrix} \begin{bmatrix} T_d(k) \\ P_D(k) \\ P_C(T_{OA}-T_z,k) \end{bmatrix}$$

$$\begin{bmatrix} T_z(k) \\ P_B(k) \end{bmatrix} = \begin{bmatrix} 0 & 1 & 0 \\ 0 & 0 & 1 \end{bmatrix} \begin{bmatrix} T_s(k) \\ T_z(k) \\ P_{D2}(k) \end{bmatrix} + \begin{bmatrix} 0 & 0 & 0 \\ 0 & -1 & 1 \end{bmatrix} \begin{bmatrix} T_d(k) \\ P_D(k) \\ P_C(T_{OA}-T_z,k) \end{bmatrix}$$

Figure 11:
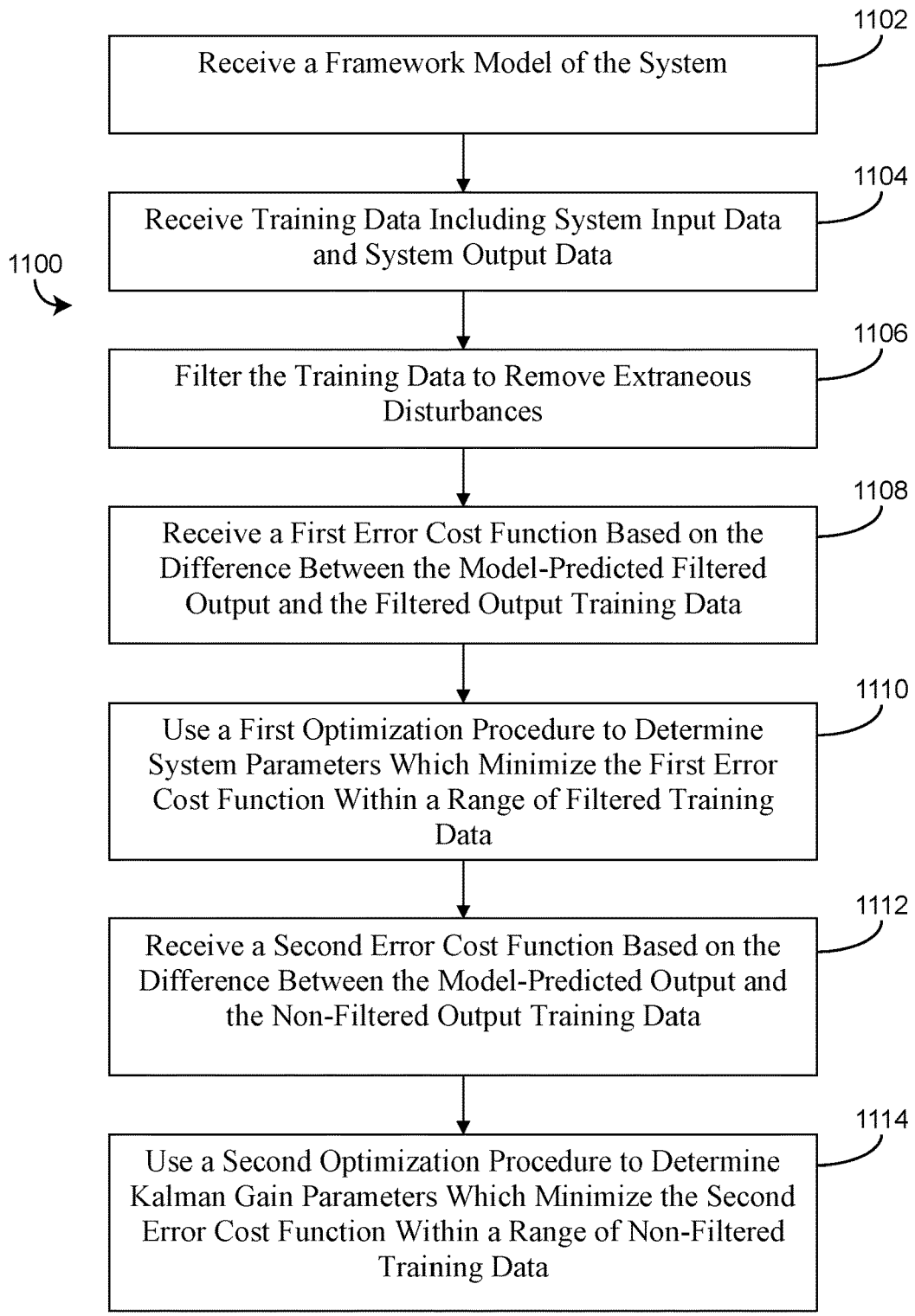
FIG. 11 is a flowchart of a process for identifying model parameters in an offline or batch process system identification process using a set of training data, according to an exemplary embodiment.

Referring now to FIG. 11, a flowchart of a process 1100 to identify unspecified system parameters in a framework model is shown, according to an exemplary embodiment. Process 1100 may use an offline (batch) process to identify system parameters using a set of training data (e.g., sample input and output data used to gauge the response of the building system). However, in other embodiments, other system identification processes may be used. Process 1100 may be used to identify model parameters θ which minimize the cost of prediction error (e.g., the cost of differences between model-predicted outputs and the true system outputs).

In the exemplary embodiment, process 1100 may include receiving a framework energy model for the building system (step 1102), receiving training data including system input data and system output data (step 1104), filtering the training data to remove extraneous disturbances (step 1106), receiving a first error cost function based on the difference between the filtered output training data and a model-predicted filtered output (step 1108), and using a first optimization procedure to determine system parameters which minimize the first error cost function within a range of filtered training data (step 1110).

In some embodiments, process 1100 may further include receiving a second error cost function based on the difference between non-filtered output training data and a model-predicted non-filtered output (step 1112), and using a second optimization procedure to determine Kalman gain parameters which minimize the second error cost function within a range of non-filtered training data (step 1114).

Referring more particularly to FIG. 11, process 1100 includes receiving a framework energy model for the building system (step 1102). The framework energy model may be a framework energy model for the entire system or may be a framework energy model for either the inner MPC controller or outer MPC controller. In the exemplary embodiment, step 506 of process 500 may be used to develop a framework model using a discrete time state space representation of the building system with variable system parameters θ. For example, the framework energy model of the building system used by the inner MPC controller can be expressed as:

$$\begin{bmatrix} T_z(k+1) \\ I(k+1) \\ P(k+1) \\ \dot{P}(k+1) \end{bmatrix} = \begin{bmatrix} 1-\theta_1 & \theta_1\theta_2 & 0 & 0 \\ -1 & 1 & 0 & 0 \\ 0 & 0 & 1 & 1 \\ -\theta_3 & \theta_2\theta_3 & -\theta_4\theta_5 & 1-\theta_4-\theta_5 \end{bmatrix} \begin{bmatrix} T_z(k) \\ I(k) \\ P(k) \\ \dot{P}(k) \end{bmatrix} + \begin{bmatrix} \theta_1 \\ 1 \\ 0 \\ \theta_3 \end{bmatrix} T_{sp}(k)$$

$$\begin{bmatrix} T_z(k) \\ P_B(k) \end{bmatrix} = \begin{bmatrix} 1 & 0 & 0 & 0 \\ 0 & 0 & 1 & 0 \end{bmatrix} \begin{bmatrix} T_z(k) \\ I(k) \\ P(k) \\ \dot{P}(k) \end{bmatrix}$$

and the framework energy model used by the outer MPC controller can be expressed as:

$$\begin{bmatrix} T_s(k+1) \\ T_z(k+1) \end{bmatrix} = \begin{bmatrix} 1-(\theta_1+\theta_2) & \theta_2 \\ \theta_3 & 1-\theta_3 \end{bmatrix} \begin{bmatrix} T_s(k) \\ T_z(k) \end{bmatrix} + \begin{bmatrix} 0 & 0 \\ \theta_4 & 0 \end{bmatrix} \begin{bmatrix} P_D(k) \\ P_C(T_{OA}-T_z,t) \end{bmatrix}$$

$$\begin{bmatrix} T_z \\ P_B \end{bmatrix} = \begin{bmatrix} 0 & 1 \\ 0 & 0 \end{bmatrix} \begin{bmatrix} T_s(k) \\ T_z(k) \end{bmatrix} + \begin{bmatrix} 0 & 0 \\ -1 & 1 \end{bmatrix} \begin{bmatrix} P_D(k) \\ P_C(T_{OA}-T_z,t) \end{bmatrix}$$

In both models, terms representing the slowly moving disturbances may be removed as these disturbances may be subsequently accounted for using a Kalman gain, described in greater detail in reference to steps 1112 and 1114.

Still referring to FIG. 11, process 1100 may further include receiving training data including system input data and system output data (step 1104). Training data may be received by varying the manipulated inputs to the system and monitoring the resultant system outputs. For example, for the inner MPC controller system model, the temperature setpoint may be varied whereas for the outer MPC controller system model, the power setpoint be varied. For both models, the actual building temperature and building power use may be monitored and recorded as output training data. In other embodiments, other manipulated variables may be varied depending on the framework model used for this step of the system identification process.

Still referring to FIG. 11, process 1100 may include filtering the training data to remove extraneous disturbances (step 1106). Step 1106 may be performed to distinguish (a) a change in system outputs caused by varying the manipulated inputs from (b) a change in system outputs caused by external disturbances to the system. For example, in the exemplary embodiment, the effect of heat transfer through the walls of the building $P_C(T_{OA}-T_z)$ may be treated as a slowly moving disturbance with dynamics much slower than that of the inner MPC controller system. By filtering the training data, the effect of this disturbance may be eliminated, thereby allowing the actual system parameters θ to be identified with greater accuracy.

In the exemplary embodiment, the filter applied to the training data may be a fourth-order high-pass Bessel filter with a cutoff frequency of $\omega_c$ of $1.75*10^{-3}$ rad/s. However, in other embodiments, other types of filters may be used, including band-pass filters, low-pass filters, or other types of high-pass filters with different cutoff frequencies. The type of filter may be driven by the frequency characteristics of the effects sought to be eliminated from the training data. For example, the cutoff frequency may chosen to eliminate the effects of slowly moving disturbances such as weather conditions or internal heat generation within the building while still capturing the dynamics of the system as they exist without external disturbances.

Still referring to FIG. 11, process 1100 may further include receiving a first error cost function (step 1108). Because filtered training data may be used for steps 1106-1110, the first error cost function may be based on the difference between the filtered output training data and the model-predicted filtered output (e.g., the error e). In some embodiments, the first error cost function may be pre-defined, received from memory, specified by a user, or otherwise received from any other source or process. In other embodiments, receiving the first error cost function may include defining or deriving the first error cost function.

Exemplary first error cost functions may include:

$$l[y(k)-\hat{y}(k|k-1)]=l[e(k)]=e^2(k)$$

which may be optimal for normally distributed errors, but sensitive to outliers:

$$l[e(k)] = \begin{cases} c^2\sigma^2 + c\sigma - e(k) & e(k) < -c\sigma \\ e^2(k) & -c\sigma < e(k) < c\sigma \\ c^2\sigma^2 - c\sigma + e(k) & e(k) > c\sigma \end{cases}$$

which linearizes error cost l for errors e outside specified bounds, and:

$$l[e(k)] = \begin{cases} c^2\sigma^2 & e(k) < -c\sigma \\ e^2(k) & -c\sigma < e(k) < c\sigma \\ c^2\sigma^2 & e(k) > c\sigma \end{cases}$$

for which the error cost l does not increase once the error e exceeds a threshold.

Still referring to FIG. 11, process 1100 may further include using a first optimization procedure to determine system parameters which minimize the first error cost function over a range of filtered training data (step 1110). Numerous optimization procedures may be used to minimize the first error cost function, including Gauss-Newton, Ninness-Wills, adaptive Gauss-Newton, Gradient Descent, and Levenberg-Marquardt search algorithms. The optimization procedure may use any of these search algorithms, a subset thereof, or any other minimization technique, algorithm, method, or procedure. For optimization purposes, initial system states may be estimated, received from a separate process, specified by a user, or fixed at any value.

The first error cost function may be used to determine the cost of prediction error within a range of filtered training data. The range of filtered training data may comprise the entire set of training data or a subset thereof. The training data used by the first error cost function may be automatically specified, chosen by a user, or otherwise determined by any other method or process.

Still referring to FIG. 11, process 1100 may further include receiving a second error cost function (step 1112). In some embodiments, the second error cost function may be pre-defined and may simply be received from memory, specified by a user, or otherwise received from any other source or process. In other embodiments, receiving the second error cost includes defining the second error cost function.

The second error cost function may use the same error cost algorithm as the first error cost function or it may use a different algorithm. However, unlike the first error cost function, the second error cost function may be based on the difference between the model-predicted output and the actual system output using the non-filtered training data.

Still referring to FIG. 11, process 1100 may further include using a second optimization procedure to determine Kalman gain parameters which minimize the second error cost function over a range of non-filtered training data (step 1114). In some embodiments, the Kalman gain can be parameterized and estimated along with the parameters of the system matrix as part of the first optimization procedure. In other embodiments, the system parameters may be estimated first using filtered training data while the Kalman gain parameters are fixed at zero. Then, the system parameters may be fixed and a second optimization procedure may be used to determine optimal Kalman gain parameters which minimize the cost of prediction error using the non-filtered training data.

Advantageously, determining the system parameters first allows for a more accurate prediction and reduces the possibility that the optimization procedure will settle on one of the local minima produced by estimating both the system parameters and the Kalman gain parameters simultaneously. Additionally, a separately determined Kalman gain may allow the MPC controller to predict future outputs, estimate system states, and optimally attribute measurement errors to either errors in the state estimate or to measurement noise.

Another advantage of process 1100 is the ability to estimate the current value of the load $P_C$. Thus, in the exemplary embodiment, the framework energy model shown in the following equations is used to estimate the steady-state Kalman gain for the building system model used by the inner MPC controller:

$$\begin{bmatrix} T_z(k+1) \\ I(k+1) \\ P_\Delta(k+1) \\ \dot{P}_\Delta(k+1) \\ P_C(k+1) \end{bmatrix} =$$

$$\begin{bmatrix} 1-\theta_1 & \theta_1\theta_2 & 0 & 0 & 0 \\ -1 & 1 & 0 & 0 & 0 \\ 0 & 0 & 1 & 1 & 0 \\ -\theta_3 & \theta_2\theta_3 & -\theta_4\theta_5 & 1-\theta_4-\theta_5 & 0 \\ 0 & 0 & 0 & 0 & 1 \end{bmatrix} \begin{bmatrix} T_z(k) \\ I(k) \\ P_\Delta(k) \\ \dot{P}_\Delta(k) \\ P_C(k) \end{bmatrix} + \begin{bmatrix} \theta_1 \\ 1 \\ 0 \\ \theta_3 \\ 0 \end{bmatrix} T_{sp}(k) + v(k)$$

$$\begin{bmatrix} T_z(k) \\ P_B(k) \end{bmatrix} = \begin{bmatrix} 1 & 0 & 0 & 0 & 0 \\ 0 & 0 & 1 & 0 & 1 \end{bmatrix} \begin{bmatrix} T_z(k) \\ I(k) \\ P_\Delta(k) \\ \dot{P}_\Delta(k) \\ P_C(k) \end{bmatrix} + w(k)$$

with a parameterized Kalman gain of:

$$K(\theta) = \begin{bmatrix} \theta_6 & \theta_7 \\ \theta_8 & \theta_9 \\ \theta_{10} & \theta_{11} \\ \theta_{12} & \theta_{13} \\ \theta_{14} & \theta_{15} \end{bmatrix}$$

In the exemplary embodiment, the Kalman gain may be estimated for the outer MPC controller model using the following equations:

$$\begin{bmatrix} T_s(k+1) \\ T_z(k+1) \\ P_{D2}(k+1) \end{bmatrix} = \begin{bmatrix} 1-(\theta_1+\theta_2) & \theta_2 & 0 \\ \theta_3 & 1-\theta_3 & \theta_4 \\ 0 & 0 & \varphi_1 \end{bmatrix}$$

$$\begin{bmatrix} T_s(k) \\ T_z(k) \\ P_{D2}(k) \end{bmatrix} + \begin{bmatrix} \theta_1 & 0 & 0 & 0 \\ 0 & \theta_4 & 0 & 0 \\ 0 & 0 & 0 & 1 \end{bmatrix} \begin{bmatrix} T_d(k) \\ P_D(k) \\ P_C(T_{OA}-T_z,k) \\ \tilde{P}_{D2}(k) \end{bmatrix}$$

$$\begin{bmatrix} T_z(k) \\ P_B(k) \end{bmatrix} = \begin{bmatrix} 0 & 1 & 0 \\ 0 & 0 & 1 \end{bmatrix} \begin{bmatrix} T_s(k) \\ T_z(k) \\ P_{D2}(k) \end{bmatrix} + \begin{bmatrix} 0 & 0 & 0 & 0 \\ 0 & -1 & 1 & 0 \end{bmatrix} \begin{bmatrix} T_d(k) \\ P_D(k) \\ P_C(T_{OA}-T_z,k) \\ \tilde{P}_{D2}(k) \end{bmatrix}$$

with a parameterized Kalman gain of:

$$K(\theta) = \begin{bmatrix} \theta_6 & \theta_7 \\ \theta_8 & \theta_9 \\ \theta_{10} & \theta_{11} \end{bmatrix}$$

The parameters in the A and B matrices may be held constant at the values identified by the first optimization procedure while K is determined by the second optimization procedure using the non-filtered training data.

In the exemplary embodiment, initial values for the system states may estimated by assuming that assumed that the system states are initially at a steady-state (e.g., $x_{-1}$ is the same as $x_0$). With this assumption the following algebraic equation may be solved to find the initial conditions for the states:

$$x_k = Ax_k + Bu_k \Rightarrow x_0 = (I-A)^{-1} Bu_0.$$

To solve this problem, it can be assumed that because the system states are at a steady-state and the temperature setpoint is constant, the zone temperature $T_z$ is equal to the temperature setpoint. Additionally, the measured power may be assumed to be unchanging (e.g., $\dot{P}_\Delta=0$) and can be attributed to the heat disturbances. Finally, at the steady-state, powers $P_\Delta$ and $P_C$ may be interchangeable; therefore, $P_\Delta$ may be set to zero and $P_C$ may be set to the current power usage. In this way, the state of the integrator can also be initialized to zero. With these assumptions in place, the process 1100 may identify the Kalman gain parameters using a second optimization procedure (step 1114) while fixing the system parameters at the values determined by the first optimization procedure.

Figure 12:
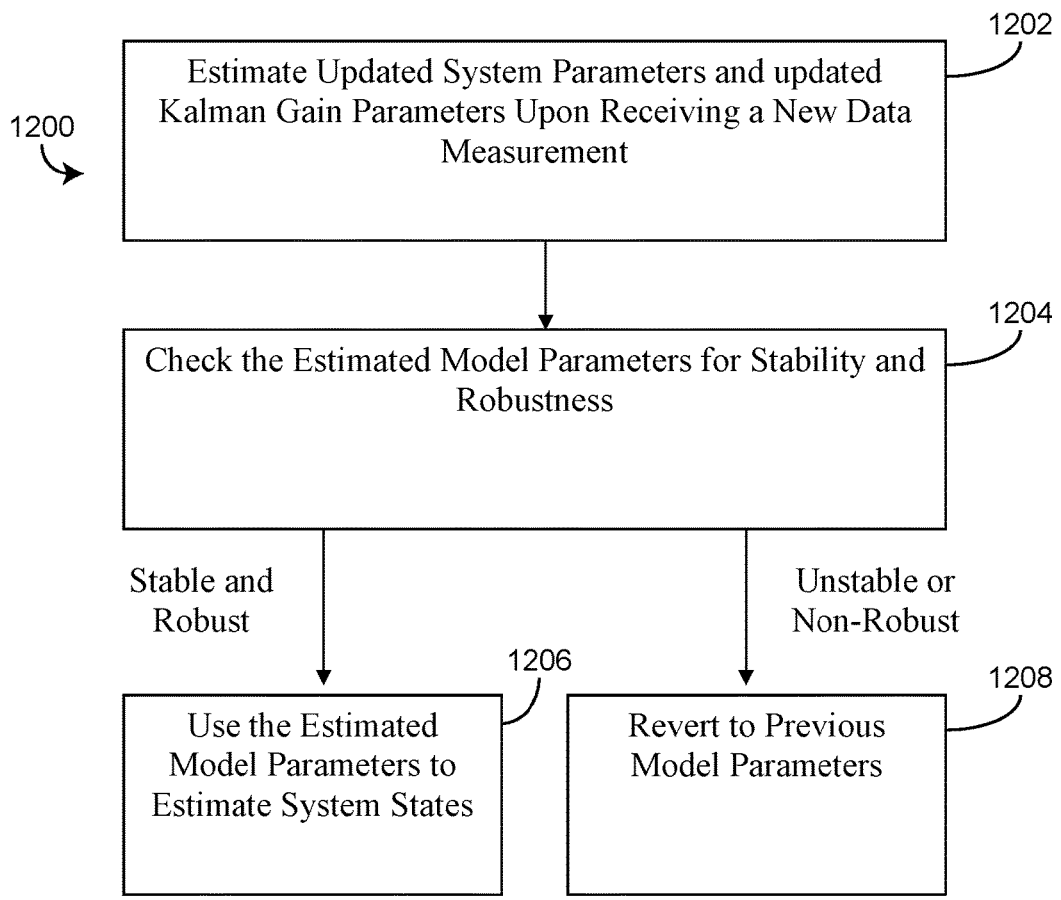
FIG. 12 is a flowchart of a process for recursively identifying updated model parameters and checking the updated model parameters for stability and robustness, according to an exemplary embodiment.

Referring now to FIG. 12, a flowchart of a process 1200 to recursively identify model parameters is shown, according to an exemplary embodiment. Recursive system identification has several advantages over batch system identification. For example, in recursive identification, the current knowledge of system parameters may be stored in an identifier "state" which is used to determine the current estimate. The state of the identification algorithm may be updated, and the estimate recalculated, each time a new measurement is obtained. Because recursive identification allows the estimate to be updated with each new measurement, memory requirements may be significantly reduced as it is not required to store each measurement in memory. Additionally, computational time may be significantly reduced because a large number of optimization iterations are no longer required with every measurement.

Another advantage of recursive identification is adaptability. For example, a recursive identification process may be able to compensate for slowly changing system parameters and may overcome the difficulty in modeling a changing physical world. In the exemplary embodiment, model inaccuracies may be anticipated and the model may be adjusted recursively through feedback and weighting functions. Initial parameter values and system state values may be determined by the batch processing method 1100 previously disclosed or otherwise received from any other source.

Still referring to FIG. 12, process 1200 may include estimating updated values for the model parameters (e.g., the system parameters and/or the Kalman gain parameters, a subset of the system and/or Kalman gain parameters known to be more likely to change, etc.) each time a new data measurement is received (step 1202), checking the estimated model parameters for stability and robustness (step 1204), and either using the estimated model parameters to estimate system states (step 1206), or reverting to previous model parameters (1208).

In the exemplary embodiment, step 1202 may include using an estimation process inspired by the extended Kalman filter (EKF). The following derivation adapts the EKF to a generalized case of a multiple-input multiple-output (MIMO) system for use in process 1200. For example, the model parameters θ may be estimated using the following EKF equations:

$$\hat{\theta}(k+1) = \hat{\theta}(k) + L(k)[y(k) - \hat{y}(k|k-1)],$$

$$L(k) = P_\theta(k) \mathcal{C}^T(k)[\mathcal{C}(k) P_\theta(k) \mathcal{C}^T(k) = R]^{-1},$$

$$P_\theta(k+1) = P_\theta(k) + Q_P + L(k)[\mathcal{C}(k) P_\theta(k) \mathcal{C}^T(k) + R] L^T(k),$$

where the state update matrix is the identity matrix and $P_\theta(k)$ is the parameter estimation error covariance. To calculate the time varying equivalent to the measurement equation, C, for the EKF, the generic update equation for normal distributions may be used, as shown in the following equations:

$$\hat{\theta}(k+1) = \hat{\theta}(k) + \Sigma_{\theta\omega} \Sigma_{\omega\omega}^{-1} [y(k) - \hat{y}(k|k-1)],$$

$$P_\theta(k+1) = P_\theta(k) + Q_P + \Sigma_{\theta\omega} \Sigma_{\omega\omega}^{-1} \Sigma_{\theta\omega}^T$$

$$\Sigma_{\theta\omega} = E\{[\theta(k) - \hat{\theta}(k)][y(k) - \hat{y}(k|k-1)]^T\},$$

$$\Sigma_{\omega\omega} = E\{[y(k) - \hat{y}(k|k-1)][y(k) - \hat{y}(k|k-1)]^T\}.$$

where $\Sigma_{\theta\omega}$ and $\Sigma_{\omega\omega}$ are the cross covariance between the parameter estimation error and the output estimation error and the covariance of the output estimation error, respectively. To calculate these to covariance matrices recursively and obtain the EKF equations shown above, the actual measurement may be approximated linearly as:

$$y(k) \approx C(\hat{\theta}(k)) \cdot \hat{x}(k|k-1) + D(\hat{\theta}(k)) \cdot u(k) + C_{x=\hat{x}}\big|_{\theta=\hat{\theta}} \big(\theta(k) - \hat{\theta}(k)\big) + w(k).$$

Using this linear approximation, the covariances $\Sigma_{\theta\omega}$ and $\Sigma_{\omega\omega}$ can be approximated as follows:

$$\Sigma_{\theta\omega} = E\{[\theta(k) - \hat{\theta}(k)][y(k) - \hat{y}(k|k-1)]^T\}$$

$$\Sigma_{\theta\omega} = E\left\{[\theta(k) - \hat{\theta}(k)]\left[C_{x=\hat{x}}\big|_{\theta=\hat{\theta}}\big(\theta(k) - \hat{\theta}(k)\big) + w(k)\right]^T\right\},$$

$$\Sigma_{\theta\omega} = P_\theta C_{x=\hat{x}}^T\big|_{\theta=\hat{\theta}},$$

$$\Sigma_{\omega\omega} = E\{[y(k) - \hat{y}(k|k-1)][y(k) - \hat{y}(k|k-1)]^T\},$$

$$\Sigma_{\omega\omega} = \left\{\left[C_{x=\hat{x}}\big|_{\theta=\hat{\theta}}\big(\theta(k) - \hat{\theta}(k)\big) + w(k)\right]\left[C_{x=\hat{x}}\big|_{\theta=\hat{\theta}}\big(\theta(k) - \hat{\theta}(k)\big) + w(k)\right]^T\right\},$$

$$\Sigma_{\omega\omega} = C_{x=\hat{x}}\big|_{\theta=\hat{\theta}} P_\theta C_{x=\hat{x}}^T\big|_{\theta=\hat{\theta}} + R.$$

and used to update the parameter estimates in the EKF equations shown above.

In the exemplary embodiment, $\mathcal{C}$ may be resolved by assuming that the state estimate is equal to the actual state for a given parameter value. While this may not be true due to noise in the system, it may asymptotically true in terms of the expected parameter values. Because the system state estimates are also functions of the model parameters, $\mathcal{C}$ can then be written as, $$C(\theta; k) = \frac{d}{d\theta}[C(\theta) \cdot \hat{x}(\theta; k|k-1) + D(\theta) \cdot u(k)],$$

and using the product rule, as:

$$C(\theta; k) = C(\theta) \frac{d}{d\theta} \hat{x}(\theta; k|k-1) +$$

$$\left[\frac{dC}{d\theta_1} \hat{x}(\theta; k|k-1) \frac{dC}{d\theta_2} \hat{x}(\theta; k|k-1) \ldots \frac{dC}{d\theta_d} \hat{x}(\theta; k|k-1)\right] +$$

$$\left[\frac{dD}{d\theta_1} u(k) \frac{dD}{d\theta_2} u(k) \ldots \frac{dD}{d\theta_2} u(k)\right],$$

$$C(\theta; k) = C(\theta) \eta(\theta; k) + \mathcal{D}(\theta; \hat{x}, u; k).$$

In the exemplary embodiment, the derivatives of the matrices C and D may be determined by the model parameters, whereas the derivative of the state estimate η may be estimated recursively using in the following equation:

$$\eta(\theta; k+1) = \frac{d}{d\theta} \hat{x}(\theta; k+1|k) = \frac{d}{d\theta}[A(\theta)\hat{x}(\theta; k|k-1) + B(\theta)u(k) + K(\theta)\varepsilon(k)],$$

$$= A(\theta)\eta(\theta; k) - K(\theta)C(\theta; k) +$$

$$\left[\frac{dA}{d\theta_1} \hat{x}(\theta; k|k-1) \frac{dA}{d\theta_2} \hat{x}(\theta; k|k-1) \ldots \frac{dA}{d\theta_d} \hat{x}(\theta; k|k-1)\right] +$$

$$\left[\frac{dB}{d\theta_1} u(k) \frac{dB}{d\theta_2} u(k) \ldots \frac{dB}{d\theta_d} u(k)\right] +$$

$$\left[\frac{dK}{d\theta_1} \varepsilon(k) \frac{dK}{d\theta_2} \varepsilon(k) \ldots \frac{dK}{d\theta_d} \varepsilon(k)\right].$$

$$= A(\theta)\eta(\theta; k) - K(\theta)C(\theta; k) + \mathcal{M}(\theta; \hat{x}, u; k) + \mathcal{K}_\varepsilon(\theta; \varepsilon; k)$$

where, $$\varepsilon(k) \equiv y(k) - \hat{y}(k|k-1)$$

Therefore, recursive system identification process 1200 may use the following restated equations to estimate updated values for the model parameters each time a new measurement is obtained (step 1202):

$$\hat{y}(k|k-1) = C(\hat{\theta}(k))\hat{x}(k|k-1) + D(\hat{\theta}(k))u(k)$$

$$\varepsilon(k) = y(k) - \hat{y}(k|k-1)$$

$$\mathcal{C}(k) = C(\hat{\theta}(k))\eta(k) + \mathcal{D}(\hat{\theta}(k); \hat{x}, u; k)$$

$$L(k) = P_\theta(k)\mathcal{C}^T(k)[\mathcal{C}(k)P_\theta(k)\mathcal{C}^T(k) + R]^{-1}$$

$$\hat{\theta}(k+1) = \hat{\theta}(k) + L(k)\varepsilon(k)$$

Process 1200 may further include includes using the updated model parameters to estimate the system states (step 1206). An EKF could be developed to estimate both the system states and the model parameters simultaneously; however, this configuration may not converge if the noise properties of the system are unknown. Therefore, in an exemplary embodiment, system states may be estimated using a Kalman gain which is dependent on the model parameters according to the following difference equations:

$$\hat{x}(k+1|k)=A(\hat{\theta}(k))\hat{x}(k|k-1)+B(\hat{\theta}(k))u(k)+K(\hat{\theta}(k))\varepsilon(k),$$

$$P_\theta(k+1)=P_\theta(k)+Q_p+L(k)[\mathcal{C}(k)P_\theta(k)\mathcal{C}^T(k)+R]L^T(k),$$

$$\eta(k+1)=A(\hat{\theta}(k))\eta(k)-K(\hat{\theta}(k))\mathcal{C}(k)+\mathcal{H}(\hat{\theta}(k);\hat{x},u;k)+\mathcal{K}_\varepsilon(\hat{\theta}(k);\varepsilon;k)$$

which follow from the derivation above.

Still referring to FIG. 12, process 1200 may further include checking the estimated model parameters for stability and robustness (step 1204) and reverting to previous model parameters if the estimated model parameters are either unstable or non-robust (step 1208). In the exemplary embodiment, step 1204 may be accomplished using the estimated model parameters to update the difference equations shown above and then checking the updated equations for stability. The difference equations may be stable if, for the domain $\mathcal{S}$, the parameters are such that the eigenvalues of A-KC are strictly less than one. In other words:

$$\theta \in \hat{\mathcal{S}} \subset \mathfrak{R}^d \text{ iff } \text{eig}\{A(\theta)-K(\theta)C(\theta)\}<1$$

Thus, to keep the difference equations stable, the parameter update equation may be replaced with:

$$\hat{\theta}(k+1) = \begin{cases} \hat{\theta}(k)+L(k)\varepsilon(k), & \hat{\theta}(k)+L(k)\varepsilon(k) \in \mathcal{S} \\ \hat{\theta}(k), & \hat{\theta}(k)+L(k)\varepsilon(k) \notin \mathcal{S} \end{cases}$$

Therefore, in some embodiments, the model parameters are not updated (step 1208) (e.g., the estimated value is not used and the parameters revert to their previous values) if the estimated values would result in instability.

Advantageously, process 1200 achieves improved robustness by considering the effect of outlying raw data. For example, for a squared error cost function, the gradient of the cost function (at a given sample) may be stated as $-\mathcal{C}\varepsilon$. Thus, process 1200 may be a modified descent process in which the EKF equations (e.g., the parameter update equations used in step 1202) are used to scale and modify the direction of the descent. For example, the gradient of the cost function may be stated as:

$$\nabla J_\varepsilon = -C(k)\frac{dl}{d\theta},$$

which when applied to the following cost function, becomes:

$$l[e(k)] = \begin{cases} c^2\sigma^2 & e(k) < -c\sigma \\ e^2(k) & -c\sigma < e(k) < c\sigma \\ c^2\sigma^2 & e(k) > c\sigma \end{cases} \rightarrow \nabla J_\varepsilon = \begin{cases} 0 & \varepsilon(k) < -c\sigma \\ -C(k)\varepsilon(k) & -c\sigma < \varepsilon(k) < c\sigma \\ 0 & \varepsilon(k) > c\sigma \end{cases}$$

Thus, in process 1200 the parameter set may not be updated (step 1208) if the output estimation error is large (e.g., exceeds a threshold defined by $c\sigma$).

Figure 13:
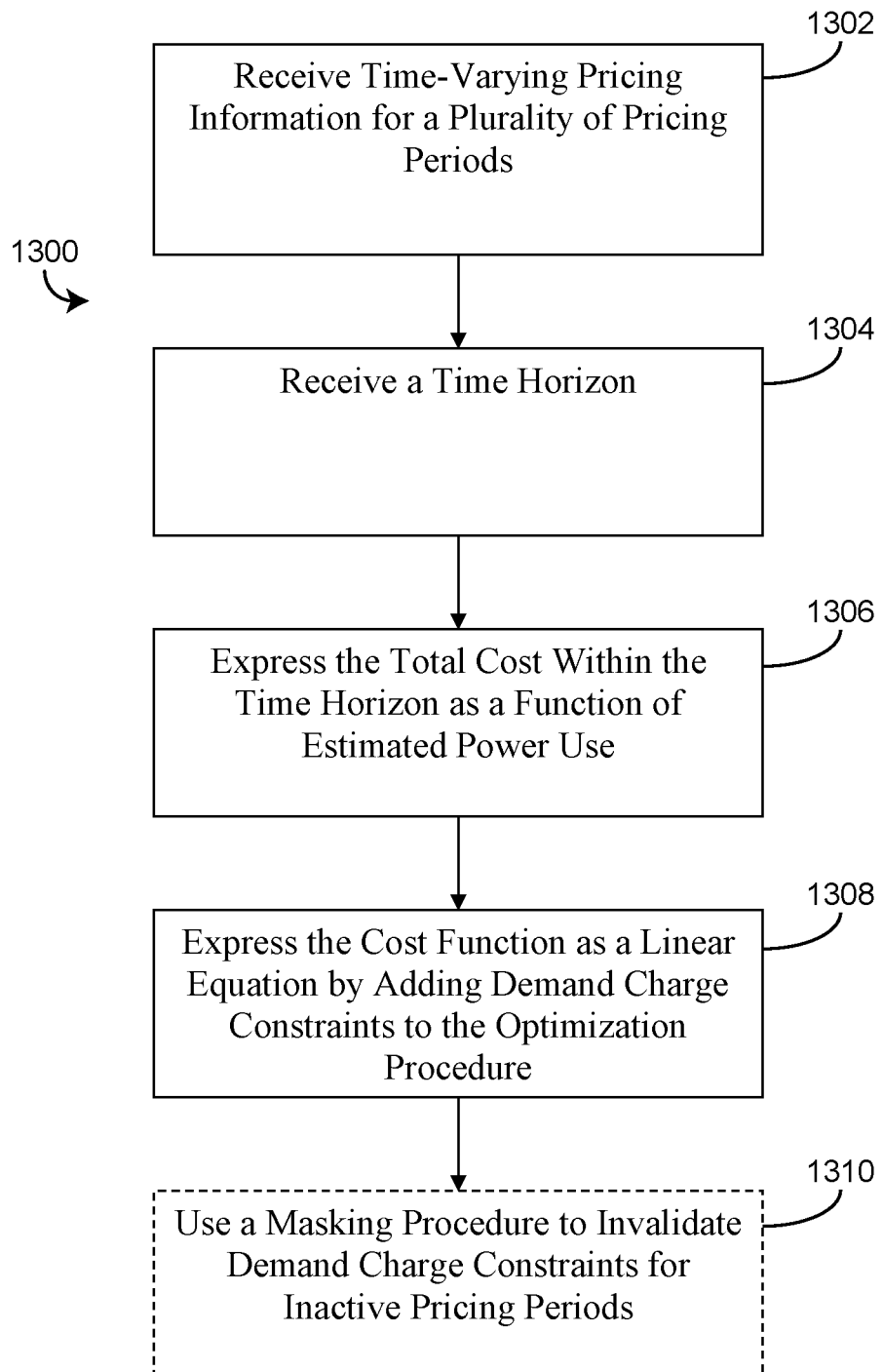
FIG. 13 is a flowchart of a process for defining an energy cost function, linearizing the cost function by adding demand charge constraints to the optimization procedure, and masking invalid demand charge constraints, according to an exemplary embodiment.

Referring now to FIG. 13, a flowchart of a cost function definition process 1300 is shown, according to an exemplary embodiment. Process 1300 may be used to accomplish some or all of step 406 of process 400. In the exemplary embodiment, process 1300 may include receiving time-varying pricing information for a plurality of pricing periods (step 1302), receiving a time horizon (step 1304), expressing the total cost of energy within the time horizon as a function of estimated power use (step 1306), expressing the cost function as a liner equation by adding demand charge constraints to the optimization procedure (step 1308), and using a masking procedure to invalidate demand charge constraints for inactive pricing periods (step 1310).

Still referring to FIG. 13, process 1300 may include receiving pricing information including energy charge information and demand charge information for a plurality pricing periods (step 1302). However, in other embodiments, pricing information may include only energy charge information or only demand charge information or such information may pertain to only one pricing period.

Energy charge information may include the cost of energy for some or all of the pricing periods. In an exemplary embodiment, the cost of energy is defined on a per-unit basis (e.g., $/Joule, $/kWh, etc.). However, in other embodiments, energy cost may be defined on a progressive or regressive basis, segmented into one or more fixed-cost ranges of energy use, or make use of any other cost structure.

Demand charge information may include a cost corresponding to the peak power usage during one or more of the pricing periods (e.g., the maximum power used at any given time within a pricing period or combination of periods). The demand charge may be imposed for some or all of the pricing periods and pricing periods may overlap (e.g., an "anytime" period would overlap with any other period or periods). In an exemplary embodiment, the demand charge information may define the cost of power on a per-unit basis (e.g., $/W, $/kW, etc.). However, in other embodiments, the demand charge may be imposed on a progressive or regressive basis, segmented into one or more fixed-cost ranges of maximum power use, or make use of any other cost structure.

In the exemplary embodiment, pricing periods may include two or more different periods chosen from the group consisting of: off-peak, partial-peak, on-peak, critical-peak, and real-time. However, in other embodiments, more or fewer pricing periods may be used. In some embodiments, the critical-peak pricing period may be subdivided into several sub-periods having different energy charges, different demand charges, or both, as shown in FIG. 2.

A pricing period may be a time interval during which certain energy charges and/or power demand charges apply. For example, during the off-peak period energy may cost $w per kWh and the demand charge may be $y per kW, whereas during the peak period energy may cost $x per kWh and the demand charge may be $z per kW. Different pricing periods may have (1) the same energy charge but a different demand charge, (2) a different energy charge but the same demand charge, (3) a different energy charge and a different demand charge, or (4) the same energy charge and the same demand charge (e.g., a customer may be charged a separate demand charge for each pricing period despite both periods having the same rates).

Two or more pricing periods may overlap and gaps may exist during which no pricing period is active. A pricing period may become inactive at a specified time and reactivate at a later time while still qualifying as the same pricing period (e.g., the on-peak period may recur every day from 9:00 A.M. until 9:00 P.M. as shown in FIG. 1). Energy charge information, demand charge information, and pricing period information, may be received from the same source or from different sources, concurrently or at different times.

Still referring to FIG. 13, process 1300 may further include receiving a time horizon (step 1304). A time horizon may define how far into the future to look when predicting future system states or planning future system inputs. The time horizon may function as a prediction horizon, a control horizon, or both, depending on the application of the control system. A prediction horizon may be used by the optimization procedure 1500 to define a time period during which the cost function is minimized. Similarly, the control horizon may be used by the optimization procedure 1500 to define a time period during which the manipulated inputs to the system may be controlled. In the exemplary embodiment, the time horizon may be used as both the prediction horizon and the control horizon and may be set to $5\tau$ (e.g., five times a time constant of the system). However, in other embodiments, other time horizons may be used. The time horizon may be used by both the optimization procedure 1500 to minimize the cost function and by the masking procedure 1310 to selectively mask the inactive demand charge constraints.

Still referring to FIG. 13, process 1300 may further include using the time-varying pricing information and the time horizon to express the total cost within the time horizon as a function of estimated power use (step 1306). The optimization problem can be stated mathematically as minimizing the cost function:

$$J_{ND} = \sum_{i=1}^{ND} EC_i P_i \Delta t_i + \sum_{j=1}^{M} DC_j \max_{R_j}(P_j)$$

subject to the constraints:

$$T_{min\ i} < T_{z,i} < T_{max\ i} \forall i$$

However, only the first term of this function is linear. The second term of the cost function includes a "max" operation which selects the maximum power usage at any given time during the relevant pricing period.

Still referring to FIG. 13, process 1300 may further include expressing the cost function as a linear equation with demand charge constraints on the optimization problem (step 1308). To facilitate implementation of the "max" function in an automated optimization process (e.g., a process which minimizes the cost function within a finite time horizon), the cost function can be expressed as:

$$J_k = \sum_{i=1}^{N_P} EC_i P_i \Delta t_i + \sum_{j=1}^{M} DC_{Rj} P_{Rj}$$

subject to constraints:

$$(P_i - P_j)_k \le P_R$$

for all i samples within a time horizon and for all j demand charge regions (e.g., pricing periods), where $P_R$ represents the maximum power in the region from previous time steps in the billing cycle. For example, the value of $P_R$ may initially be zero at the beginning of a billing cycle and may increase due to constraints on the zone temperature $T_z$.

Figure 14:
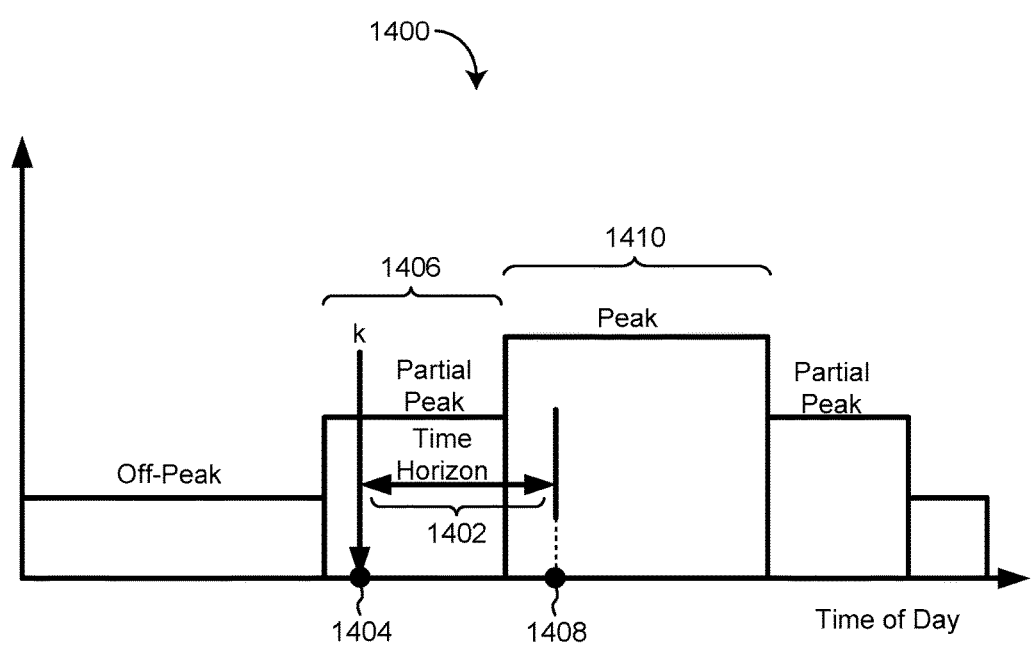
FIG. 14 is a graph showing a plurality of pricing periods, a time-step having a valid demand charge constraint within one pricing period and an invalid demand charge constraint within another pricing period, according to an exemplary embodiment.

Still referring to FIG. 13, process 1300 may further include masking the demand charge constraints on the optimization problem which apply to inactive pricing periods (step 1310). Step 1310 may be performed because all demand charge constraints may not be valid for each discrete time-step used in the optimization procedure. For example, referring to FIG. 14, the time horizon 1402 may extend from a time-step 1404 ($k$) in the partial-peak period 1406 to a future time 1408 (k+horizon) in the peak period 1410. At time-step k 1404, the demand charge constraint which applies to the peak period 1410 may be masked (e.g., marked as inactive, invalidated, deleted, erased, etc.) because time-step k 1404 does not occur during the peak period 1410. In other words, the peak pricing period 1410 is "inactive" at time-step k 1404. Similarly, the demand charge constraints which apply to the partial-peak period 1406 may be masked for all time steps within the time horizon 1402 which occur after the partial-peak period 1406 has ended.

In the exemplary embodiment, step 1310 (e.g., the masking procedure) may be included as part of process 1300 because step 1310 completes the linearization of the demand charge term by masking invalid constraints. However, in other embodiments, the step 1310 may be implemented as part of the optimization procedure 1500, as part of another process, or as an entirely separate process. In further embodiments, step 1310 may be combined with step 1308 (imposition of the demand charge constraints) so that only valid demand charge constraints are initially imposed. In such embodiments, the term "valid demand charge constraints" may be redundant because all demand charge constraints may be valid.

Figure 15:
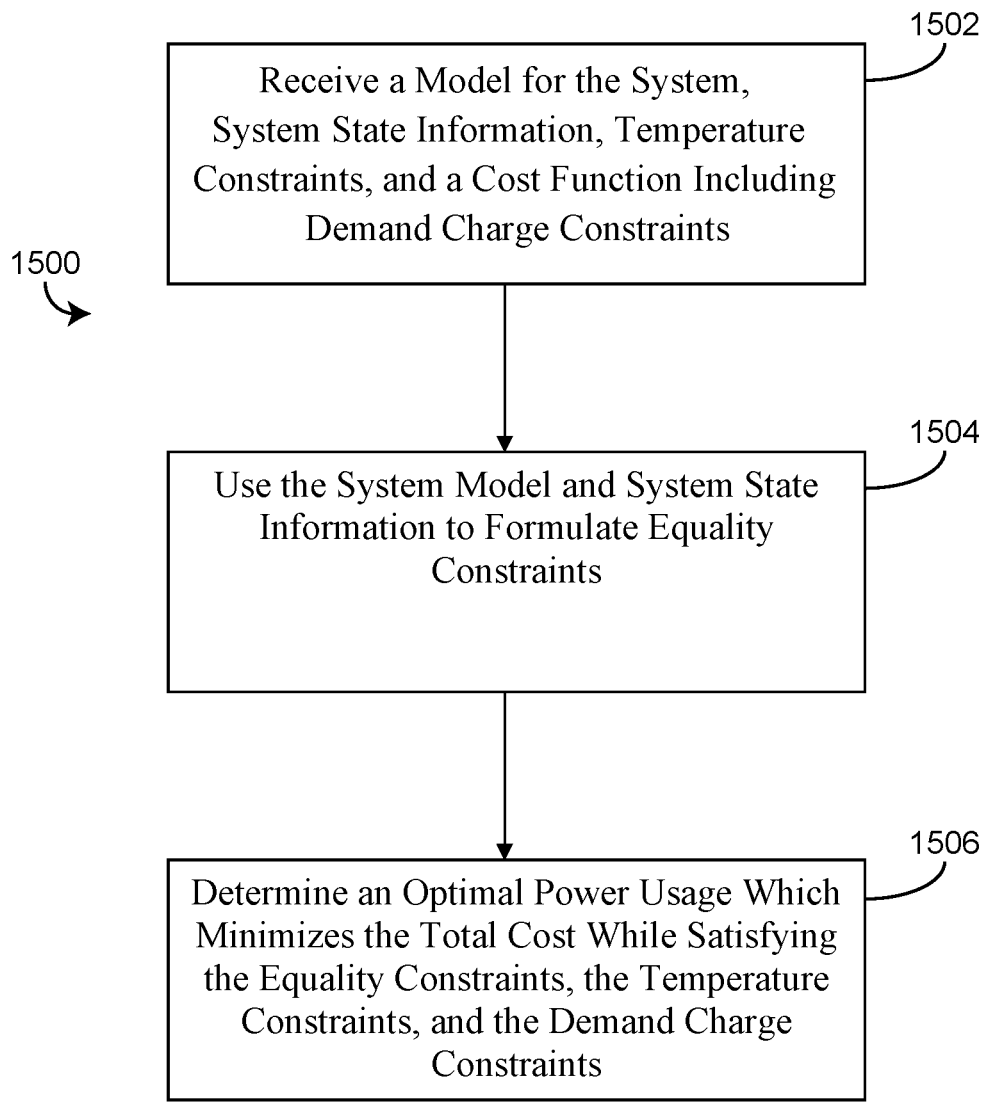
FIG. 15 is a flowchart of an optimization process for minimizing the result of an energy cost function while satisfying temperature constraints, equality constraints, and demand charge constraints.

Referring now to FIG. 15, a flowchart illustrating an energy cost optimization process 1500 is shown, according to an exemplary embodiment. Process 1500 may include receiving an energy model of the building system, system state information, temperature constraints, and an energy cost function including demand charge constraints (step 1502), using the energy model and the system state information to formulate equality constraints (step 1504), and determining an optimal power usage or setpoint to minimize the total cost of energy within a finite time horizon (e.g., minimize the energy cost determined by the cost function) while maintaining building temperature within acceptable bounds and satisfying the equality constraints and demand charge constraints (step 1506).

Process 1500 may include receiving an energy model of the building system, system state information, temperature constraints, and an energy cost function including demand charge constraints (step 1502). The energy model for the building system may be received as a pre-defined model or may be defined or derived using a model development process such as process 500, described in reference to FIG. 5.

The energy model of the building system (e.g., the system model) may be a representation of the used by the optimization procedure to predict future system states. For the outer loop MPC controller, the system model may be used to predict the value of the zone temperature $T_z$ in response to changes to the power setpoint $P_{sp}$ or changes to the amount of power to defer $P_D$. A state space representation of the outer MPC controller system model may be expressed as:

$$\begin{bmatrix} T_s(k+1) \\ T_z(k+1) \\ P_{D2}(k+1) \end{bmatrix} = \begin{bmatrix} 1-(\theta_1+\theta_2) & \theta_2 & 0 \\ \theta_3 & -\theta_3 & \theta_4 \\ 0 & 0 & 1 \end{bmatrix}$$

-continued $$\begin{bmatrix} T_s(k) \\ T_z(k) \\ P_{D2}(k) \end{bmatrix} + \begin{bmatrix} \theta_1 & 0 & 0 \\ 0 & \theta_4 & 0 \\ 0 & 0 & 0 \end{bmatrix} \begin{bmatrix} T_d(k) \\ P_D(k) \\ P_C(T_{OA} - T_z, k) \end{bmatrix}$$

$$\begin{bmatrix} T_z(k) \\ P_B(k) \end{bmatrix} = \begin{bmatrix} 0 & 1 & 0 \\ 0 & 0 & 1 \end{bmatrix} \begin{bmatrix} T_s(k) \\ T_z(k) \\ P_{D2}(k) \end{bmatrix} + \begin{bmatrix} 0 & 0 & 0 \\ 0 & -1 & 1 \end{bmatrix} \begin{bmatrix} T_d(k) \\ P_D(k) \\ P_C(T_{OA} - T_z, k) \end{bmatrix}$$

For the inner loop MPC controller, the system model may be used to predict the amount of power used by the building $P_B$ in response to changes in the temperature setpoint $T_{sp}$. A state space representation of the inner MPC controller system model may be expressed as:

$$\begin{bmatrix} T_z(k+1) \\ I(k+1) \\ P(k+1) \\ \dot{P}(k+1) \\ P_{Dist}(k+1) \end{bmatrix} = \begin{bmatrix} 1-\theta_1 & \theta_1\theta_2 & 0 & 0 & 0 \\ -1 & 1 & 0 & 0 & 0 \\ 0 & 0 & 1 & 1 & 0 \\ -\theta_3 & \theta_2\theta_3 & -\theta_4\theta_5 & 1-\theta_4-\theta_5 & 0 \\ 0 & 0 & 0 & 0 & 1 \end{bmatrix} \begin{bmatrix} T_z(k) \\ I(k) \\ P(k) \\ \dot{P}(k) \\ P_{Dist}(k) \end{bmatrix} +$$

$$\begin{bmatrix} \theta_1 \\ 1 \\ 0 \\ \theta_3 \\ 0 \end{bmatrix} T_{sp}(k)$$

$$\begin{bmatrix} T_z(k) \\ P_B(k) \end{bmatrix} = \begin{bmatrix} 1 & 0 & 0 & 0 & 0 \\ 0 & 0 & 1 & 0 & 1 \end{bmatrix} \begin{bmatrix} T_z(k) \\ I(k) \\ P(k) \\ \dot{P}(k) \\ P_{Dist}(k) \end{bmatrix} \quad K(\theta) = \begin{bmatrix} \theta_6 & \theta_7 \\ \theta_8 & \theta_9 \\ \theta_{10} & \theta_{11} \\ \theta_{12} & \theta_{13} \\ \theta_{14} & \theta_{15} \end{bmatrix}$$

In some embodiments, the system model may have static system parameters. In other embodiments, the system model may contain variable system parameters which may be altered by the optimization procedure to adapt the model to a changing system. The system model may be fully developed with identified parameters, or the system parameters may need to be identified using a system identification process. If system identification is required, the system parameters $\theta_1$-$\theta_5$ (and possibly the Kalman gain parameters $\theta_6$-$\theta_{15}$) may be identified using a system identification process 1100 and received by optimization process 1500 as part of the system model.

System state information may include a current estimation of some or all or the relevant system states. In the state space system models shown above, current system states are represented by the variables having a time step equal to k (e.g., $T_z(k)$, $T_s(k)$, etc.). Initial system states may be estimated, measured, chosen arbitrarily, calculated, received from another process, from a previous iteration of the optimization procedure, specified by a user, or received from any other source. For example, in an exemplary embodiment of the outer MPC controller system model, the system state information may include an estimation of the zone temperature $T_z$, the shallow mass temperature $T_s$, and the unmeasured disturbance power $P_{D2}$. Because $P_{D2}$ is a slowly changing disturbance, it can be estimated once as its value does not change during the prediction horizon.

Temperature constraints may be limitations on the building zone temperature $T_z$ or any other system state. The temperature constraints may include a minimum allowable temperature, a maximum allowable temperature, or both, depending on the application of the control system. Temperature constraints may be received automatically, specified by a user, imported from another process, retrieved from a data base, or otherwise received from any other source. An energy cost function may include information relating to energy prices (e.g., energy charge information, demand charge information, pricing period information, etc.) and may include demand charge constraints as described in reference to FIG. 13.

Still referring to FIG. 15, process 1500 may further include using the energy model of the building system and the system state information to formulate equality constraints (step 1504). Equality constraints may be used to guarantee that the optimization procedure considers the physical realities of the building system (e.g., energy transfer principles, energy characteristics of the building, etc.) during cost minimization. In other words, equality constraints may be used to predict the building's response (e.g., how the system states and outputs will change) to a projected power usage or temperature setpoint, thereby allowing the energy cost function to be minimized without violating the temperature constraints.

Still referring to FIG. 15, process 1500 may further include determining an optimal power usage which minimizes the total cost within the time horizon while satisfying the equality constraints, the temperature constraints, and the demand charge constraints (step 1506). Many minimization procedures can be employed to perform cost minimization including Gauss-Newton, Ninness-Wills, adaptive Gauss-Newton, Gradient Descent, Levenberg-Marquardt, or any other optimization or search algorithm.

In some embodiments, process 1500 may be performed once to determine an optimal power usage within a time horizon. Given a long enough time horizon and a perfectly accurate model, a single use of process 1500 may be satisfactory. However, over time, the system model may lose accuracy due to the difficulty in modeling a changing physical world.

Figure 16:
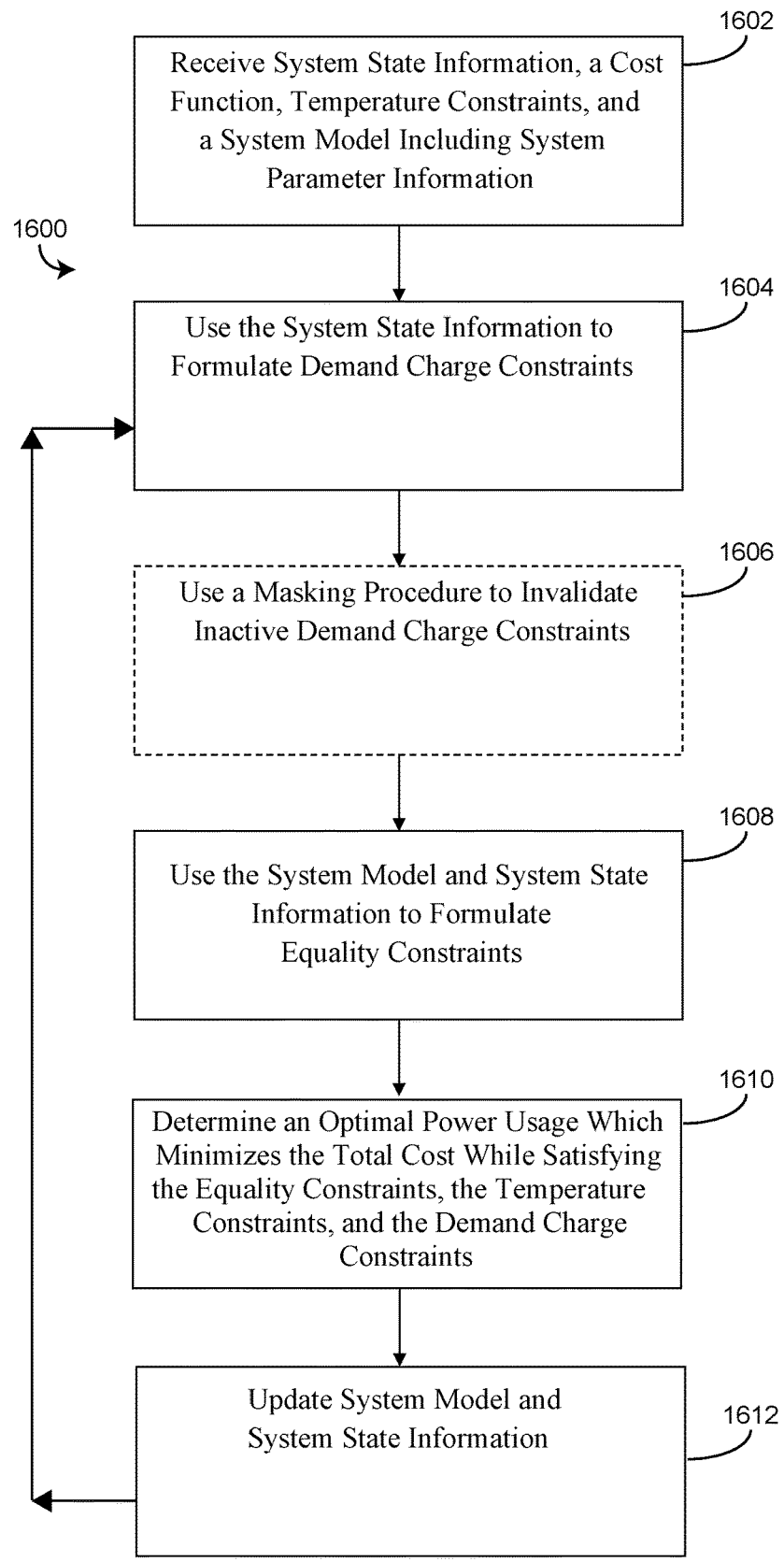
FIG. 16 is a flowchart of a process for recursively updating an energy model, updating equality constraints and demand charge constraints, and recursively implementing the masking procedure and optimization procedure.

Referring now to FIG. 16, a flowchart of a process 1600 illustrating a recursive implementation of process 1500 is shown, according to am exemplary embodiment. Advantageously, process 1600 anticipates model inaccuracies and adjusts the model recursively through feedback and weighting functions. Process 1600 may improve adaptability of the system model and may insure long-term accuracy of the optimization procedure.

Still referring to FIG. 16, process 1600 may include receiving system state information, an energy cost function, temperature constraints, and an energy model of the building system including system parameter information (step 1602). The energy model of the building system and system state information may be received from a previously identified system or may be identified using a system identification process such as process 1100, described in detail in reference to FIG. 11. Alternatively, the energy model of the building system may be received from a different process, specified by a user, retrieved from a database, or otherwise received from any other source.

The energy cost function may express a total cost of energy as a function of actual or estimated power use within a time horizon. In some embodiments, the energy cost function may be received as a completely defined function. In other embodiments, the energy cost function may be defined using a definition process such as process 1300, described in detail in reference to FIG. 13. To facilitate automated processing, the energy cost function may be expressed as a linear equation by adding demand charge constraints to the optimization procedure.

Still referring to FIG. 16, process 1600 may further include using the system state information to formulate demand charge constraints (step 1604). An example demand charge constraint may be stated as $(P_i-P_j)_k \leq P_R$ where $P_R$ represents the maximum power in the demand charge region from previous time steps in the billing cycle. In the exemplary embodiment, system state information may information regarding estimated or actual power use for a previous time-step. Thus, system state information may be used to resolve the value of $P_R$ in a demand charge constraint. Step 1604 may be substantially equivalent to step 1308 in process 1300.

Still referring to FIG. 16, process 1600 may further include using the masking procedure to invalidate the demand charge constraints which apply to inactive pricing periods (step 1606). In some embodiments, step 1606 may be performed because not all of the demand charge constraints are valid for each discrete time step used in the optimization procedure. In other embodiments, only valid demand charge constraints may be initially imposed and step 1606 may be unnecessary.

Still referring to FIG. 16, process 1600 may further include using the system model and system state information to formulate equality constraints (step 1608). Step 1608 may allow the optimization procedure to accurately predict the effects of changing inputs to the building system so that the cost function can be minimized without violating the temperature constraints.

Still referring to FIG. 16, process 1600 may further include determining an optimal power usage which minimizes the total energy cost as determined by the cost function within a time horizon while satisfying the equality constraints, the temperature constraints, and the demand charge constraints (step 1610). Many minimization procedures can be employed to perform cost minimization including Gauss-Newton, Ninness-Wills, adaptive Gauss-Newton, Gradient Descent, Levenberg-Marquardt, or any other optimization or search algorithm.

Still referring to FIG. 16, process 1600 may further include updating the system model and system state information (step 1612). Step 1612 may be accomplished using recursive system identification process 1200, batch system identification process 1100 or any other update process. The updated system model and system state information may be used to update the equality constraints and demand charge constraints a subsequent iteration of the recursive process. For example, the system state information may include power usage information for previous time-steps. This information may be used to update the value of $P_R$ if necessary (e.g., if the power used during the last unrecorded time-step was greater than the stored value of $P_R$) so that $P_R$ continues to represent the maximum power used in a demand charge region during the current billing cycle. Steps 1604-1612 may be performed recursively.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computer-implemented method for minimizing energy cost in a building system, the method comprising:
   using an energy cost function to predict, by a controller for the building system, a total cost of energy purchased from an energy provider as a function of one or more setpoints provided by the controller, the energy cost function comprising a demand charge term defining a cost per unit of power corresponding to a maximum power usage of the building system;
   linearizing, by the controller, the demand charge term by imposing demand charge constraints, wherein each of the demand charge constraints applies to a time-step and a pricing period;
   masking, by the controller, each of the demand charge constraints that applies to an inactive pricing period, wherein a demand charge constraint applies to an inactive pricing period if the time-step to which the demand charge constraint applies does not occur during the pricing period to which the demand charge constraint applies;

determining, by the controller, optimal values of the one or more setpoints by performing an optimization procedure that minimizes the total cost of energy subject to the demand charge constraints;

providing the optimal values of the one or more setpoints to equipment of the building system; and operating the equipment of the building system using the optimal values of the one or more setpoints so as to affect the maximum power usage.

2. The method of claim 1, wherein using the energy cost function to predict the total cost of energy comprises using time-varying pricing information to determine a cost of energy purchased from the energy provider during each of a plurality of time steps in a prediction period.

3. The method of claim 2, wherein the time-varying pricing information comprises a plurality of pricing structures including at least two of off-peak, partial-peak, peak, critical-peak, and real-time brokered.

4. The method of claim 1, wherein the energy cost function comprises a demand charge for each of a plurality of pricing periods.

5. The method of claim 1, further comprising receiving temperature constraints defining an acceptable temperature range for the building system;
wherein performing the optimization procedure comprises minimizing the total cost of energy subject to the temperature constraints.

6. The method of claim 1, further comprising using a dynamic model describing heat transfer characteristics of the building system to predict a temperature of the building system as a function of the one or more setpoints provided by the controller.

7. The method of claim 6, further comprising:
receiving a feedback signal indicating a measured temperature of the building system and a measured power usage of the building system; and
using the dynamic model and the feedback signal to formulate equality constraints;
wherein performing the optimization procedure comprises minimizing the total cost of energy subject to the equality constraints.

8. The method of claim 1, wherein linearizing the demand charge term by imposing demand charge constraints comprises:
replacing a nonlinear expression of the demand charge term with a linear expression that defines demand charge as a linear function of a demand charge variable; and
imposing a demand charge constraint for each time-step that constrains the demand charge variable to a value greater than or equal to power consumption of the building system during the time-step.

9. The method of claim 1, wherein masking each of the demand charge constraints that applies to an inactive pricing period comprises, for each of the demand charge constraints:
identifying the pricing period to which the demand charge constraint applies;
identifying the time-step to which the demand charge constraint applies;
determining whether the identified time-step occurs during the identified pricing period; and
selectively masking the demand charge constraint in response to a determination that the identified time-step does not occur during the identified pricing period.

10. The method of claim 1, wherein performing the optimization procedure comprises minimizing the total cost of energy subject to any demand charge constraints that have not been masked as a result of the masking.

11. A system for minimizing energy cost in a building system, the system comprising a controller configured to:
use an energy cost function to predict a total cost of energy purchased from an energy provider as a function of one or more setpoints provided by the controller, the energy cost function comprising a demand charge term defining a cost per unit of power corresponding to a maximum power usage of the building system;
linearize the demand charge term by imposing demand charge constraints, wherein each of the demand charge constraints applies to a time-step and a pricing period;
mask each of the demand charge constraints that applies to an inactive pricing period, wherein a demand charge constraint applies to an inactive pricing period if the time-step to which the demand charge constraint applies does not occur during the pricing period to which the demand charge constraint applies;
determine optimal values of the one or more setpoints by performing an optimization procedure that minimizes the total cost of energy subject to the demand charge constraints; and
provide the optimal values of the one or more setpoints to equipment of the building system; and
operate the equipment of the building system using the optimal values of the one or more setpoints so as to affect the maximum power usage.

12. The system of claim 11, wherein the controller is configured to predict the total cost of energy by using time-varying pricing information to determine a cost of energy purchased from the energy provider during each of a plurality of time steps in a prediction period.

13. The system of claim 12, wherein the time-varying pricing information comprises a plurality of pricing structures including at least two of off-peak, partial-peak, peak, critical-peak, and real-time brokered.

14. The system of claim 11, wherein the energy cost function comprises a demand charge for each of a plurality of pricing periods.

15. The system of claim 11, wherein the controller is configured to:
receive temperature constraints defining an acceptable temperature range for the building system; and
perform the optimization procedure by minimizing the total cost of energy subject to the temperature constraints.

16. The system of claim 11, wherein the controller is configured to use a dynamic model describing heat transfer characteristics of the building system to predict a temperature of the building system as a function of the one or more setpoints provided by the controller.

17. The system of claim 16, wherein the controller is configured to:
receive a feedback signal indicating a measured temperature of the building system and a measured power usage of the building system;
use the dynamic model and the feedback signal to formulate equality constraints; and
perform the optimization procedure by minimizing the total cost of energy subject to the equality constraints.

18. The system of claim 11, wherein the controller is configured to:
linearize the demand charge term by replacing a nonlinear expression of the demand charge term with a linear expression that defines demand charge as a linear function of a demand charge variable; and impose a demand charge constraint for each time-step that constrains the demand charge variable to a value greater than or equal to power consumption of the building system during the time-step.

19. The system of claim 11, wherein the controller is configured to mask each of the demand charge constraints that applies to an inactive pricing period by:
   identifying the pricing period to which the demand charge constraint applies;
   identifying the time-step to which the demand charge constraint applies;
   determining whether the identified time-step occurs during the identified pricing period; and
   selectively masking the demand charge constraint in response to a determination that the identified time-step does not occur during the identified pricing period.

20. The system of claim 11, wherein the controller is configured to perform the optimization procedure by minimizing the total cost of energy subject to any demand charge constraints that have not been masked.

* * * * *